(12) United States Patent
Kim et al.

(10) Patent No.: US 12,332,460 B2
(45) Date of Patent: *Jun. 17, 2025

(54) ELLIPTICAL BEAM DESIGN USING CYLINDRICAL OPTICS

(71) Applicants: IonQ, Inc., College Park, MD (US); Duke University, Durham, NC (US)

(72) Inventors: Jungsang Kim, Chapel Hill, NC (US); David Wong-Campos, Hyattsville, MD (US); Kai Hudek, Hyattsville, MD (US)

(73) Assignees: IonQ, Inc., College Park, MD (US); Duke University, Durham, NC (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/938,558

(22) Filed: Oct. 6, 2022

(65) Prior Publication Data

US 2023/0104791 A1 Apr. 6, 2023

Related U.S. Application Data

(63) Continuation of application No. 16/524,637, filed on Jul. 29, 2019, now Pat. No. 11,536,879.

(Continued)

(51) Int. Cl.
*G02B 27/09* (2006.01)
*G02B 3/06* (2006.01)
(Continued)

(52) U.S. Cl.
CPC ....... *G02B 3/06* (2013.01); *G02B 15/143107* (2019.08); *G02F 1/33* (2013.01)

(58) Field of Classification Search
CPC ...... G02B 3/06; G02B 27/09; G02B 27/0911; G02B 27/0938
See application file for complete search history.

(56) References Cited

U.S. PATENT DOCUMENTS

| 5,442,487 A | 8/1995 | Mizuno |
| 5,973,853 A | 10/1999 | Gaebe |

(Continued)

FOREIGN PATENT DOCUMENTS

| JP | 4-118608 A | 4/1992 |
| JP | 2008-145463 A | 6/2008 |
| JP | 2009-72789 A | 4/2009 |

OTHER PUBLICATIONS

International Invitation to Pay Additional Fees corresponding to International Application No. PCT/US2019/044077, dated Nov. 8, 2019.

(Continued)

*Primary Examiner* — Joseph P Martinez
(74) *Attorney, Agent, or Firm* — ARENTFOX SCHIFF LLP

(57) ABSTRACT

The disclosure describes various aspects of techniques for elliptical beam design using cylindrical optics that may be used in different applications, including in quantum information processing (QIP) systems. In an aspect, the disclosure describes an optical system having a first optical component having a first focal length, a second optical component having a second focal length and aligned with a first direction, and a third optical component having a third focal length and aligned with a second direction orthogonal to the first direction. The optical system is configured to receive one or more optical beams (e.g., circular or elliptical) and apply different magnifications in the first direction and the second direction to the one or more optical beams to image one or more elliptical Gaussian optical beams. A method for generating elliptical optical beams using a system as the one described above is also disclosed.

15 Claims, 15 Drawing Sheets

Related U.S. Application Data

(60) Provisional application No. 62/711,995, filed on Jul. 30, 2018.

(51) Int. Cl.
*G02B 15/14* (2006.01)
*G02F 1/33* (2006.01)

(56) References Cited

U.S. PATENT DOCUMENTS

| | | | |
|---|---|---|---|
| 11,536,879 B2* | 12/2022 | Kim | G02B 27/0927 |
| 2009/0071947 A1 | 3/2009 | Sekiguchi et al. | |
| 2009/0139652 A1 | 6/2009 | Kavosh et al. | |

OTHER PUBLICATIONS

International Search Report and Written Opinion corresponding to International Application No. PCT/US2019/044077, dated Feb. 26, 2020.
Gokeman, D.E. et al., "Optical Design for Gaussian Beam Elliptical Spot Shaping & AOM Double-pass Configuration for Realising Calcium Ion Thermal Qubit", URL <https://www.researchgate.net/profile/Doruk_Goekmen/publication/319490327 . . . >; Sep. 1, 2017, 38 pages.
Harlander, M. et al., "Trapped-ion antennae for the transmission of quantum information", ARIX.org, Cornell University Libary, Nov. 16, 2010, pp. 1-5.
Ghadimi, M. et al., "Scalable ion-photon quantum interface based on integrated diffractive mirrors", ARIX.org, Cornell University Libary, Jul. 1, 2016, pp. 1-5.
Kielpinski, D. et al., "Architecture for a large-scale ion-trap quantum computer", Nature, vol. 417, Jun. 13, 2002, pp. 709-711.
Seidelin, S. et al., "A microfabricated surface-electrode ion trap for scalable quantum information processing", ARIX.org, Cornell University Libary, Jan. 26, 2006, pp. 1-5.
Notice of Reasons for Refusal issued Oct. 18, 2022 in Japanese Patent Application No. 2021-505218.
Streed, E. W. et al., "Imaging of Trapped Ions with a Microfabricated Optic for Quantum Information Processing", Physical Review Letters, 2011年01月07E1, vol. 106, pp. 010502-1-010502-4.
Mehta, K. K. et al., "Towards fast and scalable trapped-ion quantum logic with integrated photonics", Proceedings of SPIE Advances in Photonics of Quantum Computing, Memory, and Communication XII, 2019年03月04E1, vol. 10933, pp. 109330B-1-109330B-11.
Chiaverini, J. et al., "Recent experiments in trapped-ion quantum information processing at NIST", Proceedings of SPIE ICONO 2005: Ultrafast Phenomena and Physics of Superintense Laser Fields; Quantum and Atom Optics; Engineering of Quantum Information, 2006年05月22E1, vol. 6256, pp. 625610-1-625610-12.
Notice of Reasons of Refusal issued Oct. 18, 2022 in Japanese Patent Application No. 2021-505218, 6 pages.

* cited by examiner

ELLIPTICAL BEAM DESIGN USING CYLINDRICAL OPTICS

CROSS REFERENCE TO RELATED APPLICATION

The present application is a continuation of U.S. patent application Ser. No. 16/524,637, filed Jul. 29, 2019, which in turn claims priority to and the benefit from U.S. Provisional Patent Application No. 62/711,995, filed on Jul. 30, 2018, each entitled "ELLIPTICAL BEAM DESIGN USING CYLINDRICAL OPTICS". The contents of each application are hereby incorporated by reference in their entirety.

BACKGROUND OF THE DISCLOSURE

Aspects of the present disclosure generally relate to optical systems, and more specifically, to optical systems in which cylindrical optics are used for elliptical beam design.

Trapped atoms or ions are one of the leading implementations used for quantum information processing. Quantum bit (qubits) based on trapped ions can be used as quantum memories, as quantum gates in quantum computers and simulators, and can act as nodes for quantum communication networks. Systems that use trapped ions for qubits, however, need precise control of laser phases, frequencies, amplitudes, and/or polarizations to manipulate the quantum information stored in the individual qubits. Because the trapped ions may require individualized addressing to enable such level of manipulation, and because the trapped ions are placed very close to each other, optical systems are desirable that allow for improved focusing of a laser or optical beam onto a particular ion for better manipulation of that ion.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In general, systems and methods are described for elliptical beam design using cylindrical optics that can be used in different types of systems including, for example, quantum information processing (QIP) systems.

In one example, an optical system for generating elliptical optical beams is described that includes a first optical component having a first focal length, a second optical component having a second focal length and aligned with a first direction, and a third optical component having a third focal length and aligned with a second direction orthogonal to the first direction, and where the optical system is configured to receive one or more optical beams and apply different magnifications in the first direction and the second direction to the one or more optical beams to image one or more elliptical Gaussian optical beams (also referred simply as elliptical optical beams or elliptical beams). The one or more optical beams received by the optical system may be circular Gaussian optical beams or elliptical Gaussian optical beams.

In another example, a method for generating elliptical optical beams is described that includes receiving, by an optical system, one or more optical beams, the optical system including a first optical component having a first focal length, a second optical component having a second focal length and aligned with a first direction, and a third optical component having a third focal length and aligned with a second direction orthogonal to the first direction. The method further includes imaging, by the optical system, one or more elliptical Gaussian optical beams, where the optical system is configured to apply different magnifications in the first direction and the second direction to the one or more optical beams to image the one or more elliptical Gaussian optical beams. The one or more optical beams received by the optical system may be circular Gaussian optical beams or elliptical Gaussian optical beams.

BRIEF DESCRIPTION OF THE DRAWINGS

The appended drawings illustrate only some implementation and are therefore not to be considered limiting of scope.

DETAILED DESCRIPTION

Figure 1A:
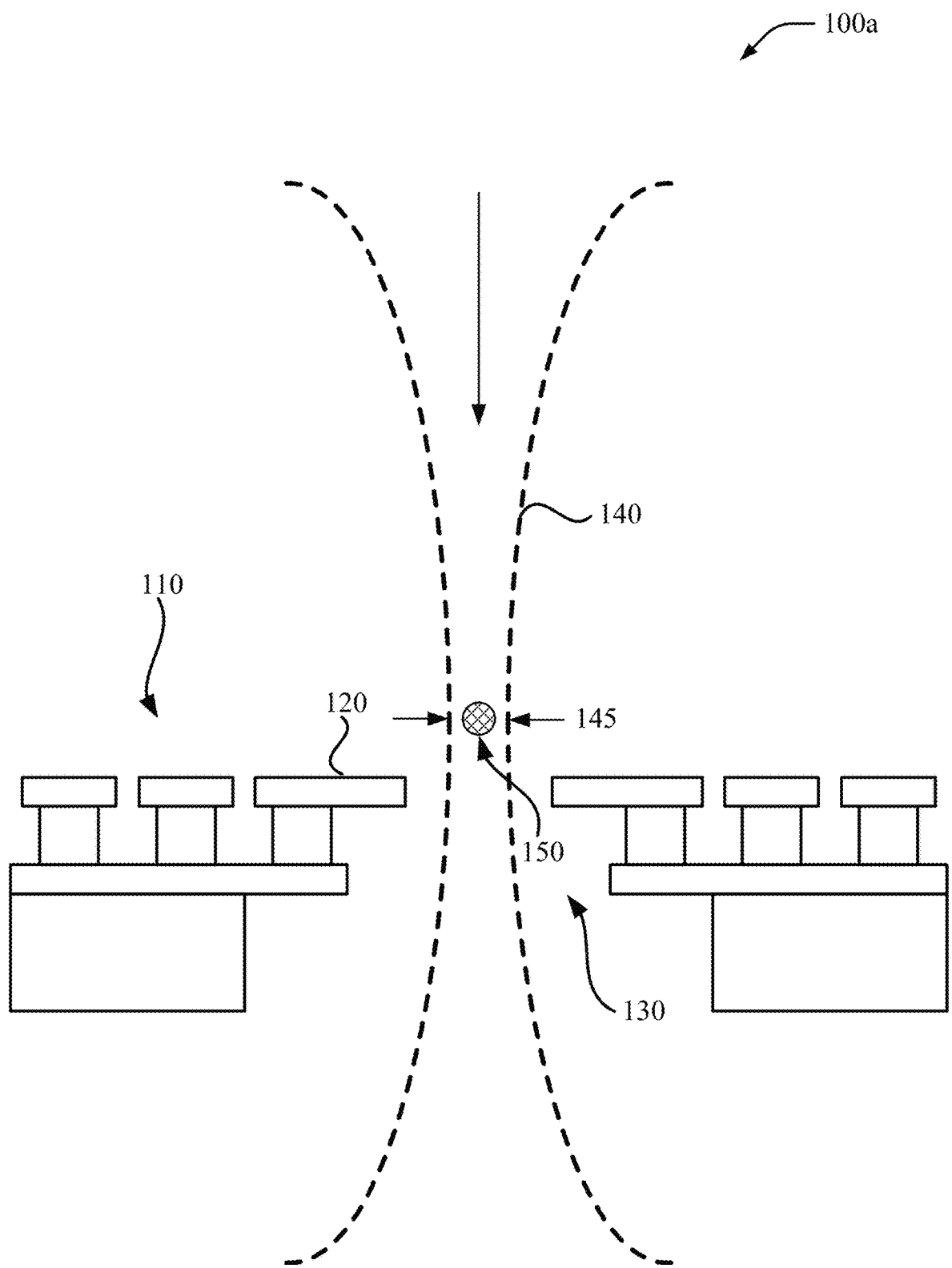
FIGS. 1A and 1B are diagrams that illustrate two possible configurations for addressing qubits in a surface trap with optical beams.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped ions may be used to implement systems for quantum information processing (or QIP systems). Qubits based on trapped ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," "ionized atoms," and "ions" may be used interchangeably to describe the particles that are to be confined, or are actually confined, in a trap to form a crystal, a lattice, a chain, or similar arrangement or configuration. Moreover, the terms "laser beams," "optical beams," "lasers," "beams," and "fields" may be used interchangeably to describe some form of illumination used to control aspects of a confined ion such as an ion in a trap.

In QIP systems precise control of phase, frequency, amplitude, and/or polarity (e.g., polarization) of optical beams is required to manipulate the quantum information stored in the ions (e.g., qubits) of a crystal or chain. In an aspect, having the ability to accurately focus the optical beam on the corresponding ion without causing cross-talk with other optical beams applied to other ions and/or clipping of the optical beam with the trap is highly desirable.

This disclosure describes techniques, including methods or processes and equipment or apparatuses, for designing highly focused elliptical beams that can avoid cross-talk and/or clipping issues. In these techniques, elliptical optical beams are formed using cylindrical optics such that the optical beams can better interact with the ions and the traps that hold the ions. Such techniques, while directed to QIP systems that use trapped ions, need not be so limited and may also be used in various optical scenarios where elliptical optical beams may be necessary.

When using optical beams to manipulate trapped ions, it is desirable that the optical beam is focused in such a way that the ion sits or is located right at the waist of the optical beam (e.g., beam waist). One reason for having the ion sit at the beam waist is that the intensity of the optical beam is highest at that point. Another reason is that because the beam waist is where the optical beam has the smallest spot size, it is less likely that the optical beam overlaps with a neighboring or adjacent optical beams to cause cross-talk. Additionally, the profile of the intensity of the optical beam is Gaussian shaped, so if the optical beam or the ion moves with respect to each other and the ion sits at the peak of the intensity the overall interaction is insensitive to slight relative movements; however, if the ion sits at one of the edges of Gaussian shaped intensity profile, then the overall interaction is highly insensitive to slight relative movements. Moreover, the wavefront of the optical beam is generally flat right at the beam waist, which is highly desirable.

Figure 1B:
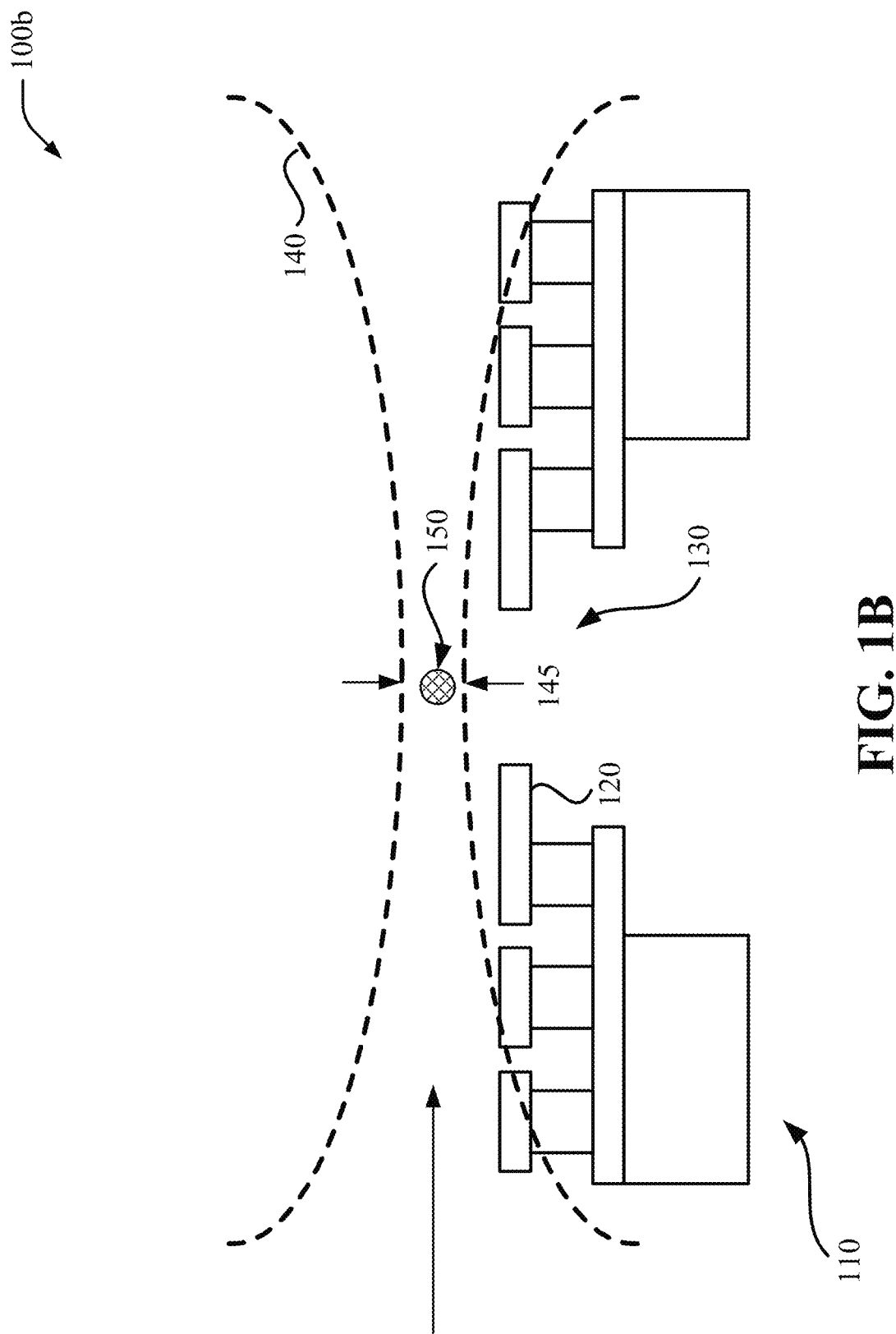

FIGS. 1A and 1B show diagrams 100a and 100b, respectively, that illustrate two possible configurations for using optical beams to individually address qubits in a surface trap (also referred to as a surface ion trap). In a surface trap it may be necessary to bring in tightly focused optical beams (e.g., laser beams) to individually address the qubits implemented using the ions in the trap. As described above, it is desirable that the ions sit or are located at the beam waist of the tightly focused optical beams. One way to do that is to use the optical configuration shown in the diagram 100a in FIG. 1A by bringing an optical beam 140 (dashed lines) through a slot 130 between electrodes 120 in the surface of a surface trap 110 such that a beam waist 145 of the optical beam 140 occurs exactly at the position of an ion 150. This configuration allows a tightly focused optical beam since the optical beam 140 only has to clear the shallow depth of the trap substrate. For a tightly focused optical beam such as the optical beam 140, a beam divergence angle (e.g., divergence from the beam waist) is given $$\theta = \frac{\lambda}{\pi w_0},$$

where $\lambda$ is the wavelength of the light and $w_0$ is the waist of the beam that represents the radius of the tightest focused spot, such as the beam waist 145. Therefore, in this configuration, the optical beam 140 can be tightly focused at the beam waist 145 where the ion 150 sits, and can pass through the slot 130 without the optical beam 140 interacting with the surface trap 110 (e.g., no clipping) because the surface trap 110 has a small thickness.

It is to be understood that the diagram 100a (and also the diagram 100b) provides a cross-sectional view of the surface trap 110 and that the surface trap 110 may hold additional ions 150 into and/or out of the plane of the diagram 100a. Accordingly, for the surface trap 110, there may be additional optical beams 140 used to manipulate the additional ions 150 of the surface trap 110 (not shown). Because the various optical beams 140 are provided from the top (see e.g., arrow direction in the diagram 100a in FIG. 1A) and can be tightly focused at the position or location of their respective ions 150 (e.g., beam waist 145) without causing cross-talk and/or clipping the surface trap 110, this configuration is effective in using optical beams to individually address qubits in a surface trap.

However, there may be various reasons, including the use of a particular system architecture, for bringing the optical beam 140 along the surface of the surface trap 110 (e.g., skimming the surface of the surface trap 110), as shown in the diagram 100b in FIG. 1B. This configuration is different from the configuration shown in the diagram 100a in FIG. 1A where the optical beam 140 is brought from the top (e.g., vertically). In this configuration, as the optical beam 140 skims across the surface of the surface trap 110 (e.g., over the electrodes 120), the divergence of the optical beam 140 can lead to clipping at the edges of the surface trap 110. This is shown in the diagram 110b where the optical beam 140 diverges or diffracts (e.g., gets less focused) from the focused point at the beam waist 145 and causes the optical beam 140 to interfere with the electrodes 120 either side of the surface trap 110. This clipping affects the optical beam 140 and may not be useful to control the ion 150. As a result, the amount of focusing that can be achieved on the optical beam 140 using this configuration is limited by the fact that a tightly focused optical beam can clip the surface trap 110 since the divergence angle is inversely proportional to the size of the beam waist 145.

To avoid this issue, it is possible to narrow the width of the surface trap 110 in this direction (e.g., the arrow direction in the diagram 100b in FIG. 1B) to minimize or avoid clipping; however, even this technique is limited because the smallest focused spot (e.g., beam waist 145) that can be achieved using this configuration tends to be much larger than what can be achieved with the configuration shown in the diagram 100a in FIG. 1A.

Figure 1C:
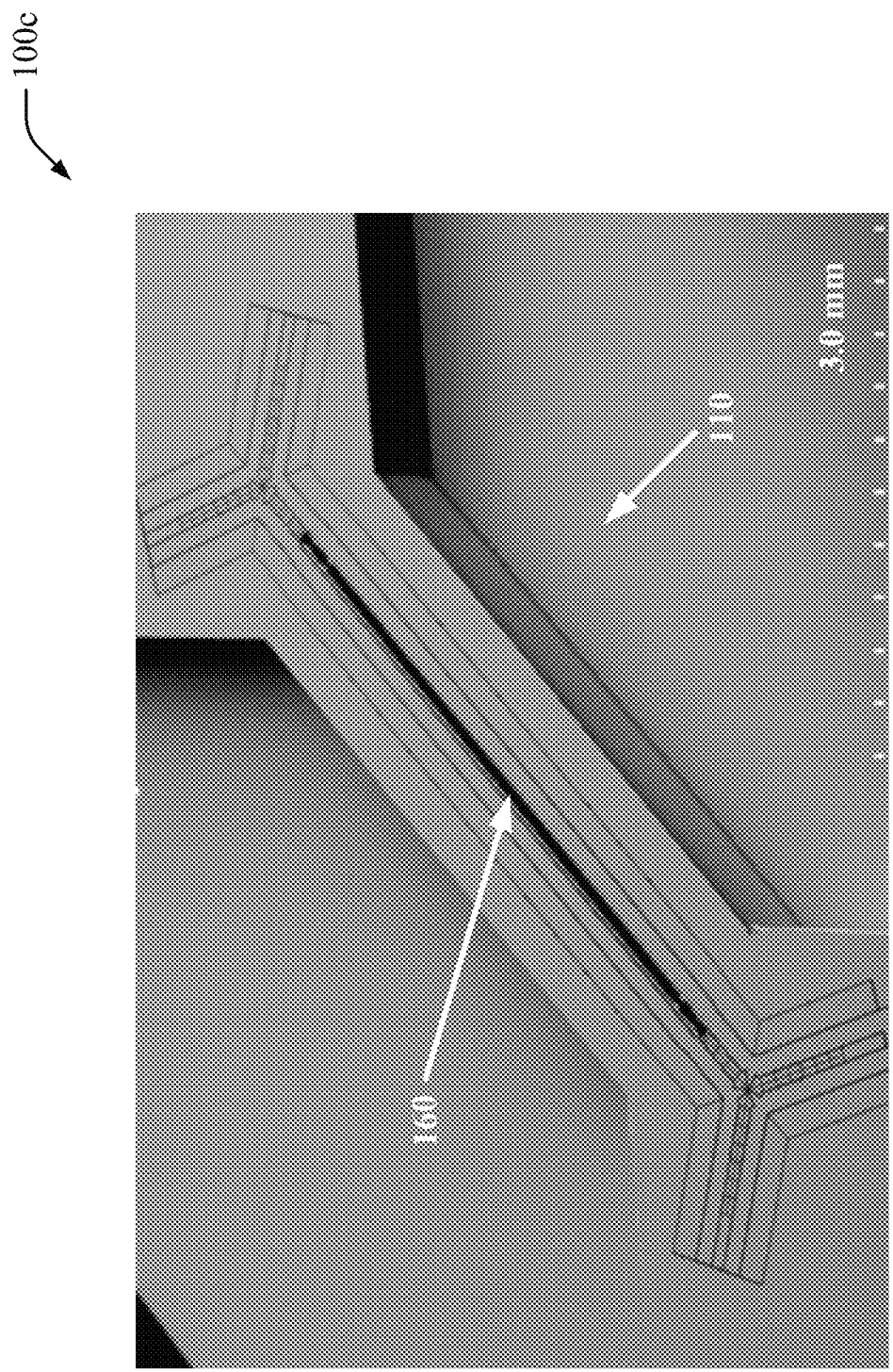
FIG. 1C is a scanning electron microscope (SEM) image that illustrates an example of a current geometry of a high-optical access (HOA) trap fabricated at Sandia National Labs.

An example of narrowing the width of the surface trap 110 provided in a diagram 100c in FIG. 1C. The diagram 100c shows a scanning electron microscope (SEM) of an example of the surface trap 110, which in this case is a high-optical access (HOA) trap fabricated at Sandia National Labs. The dark line along the middle is a slot 160 (e.g., an open hole so that the optical beam 140 can be brought vertically through the surface trap as in the diagram 100a in FIG. 1A), and the ions 150 are trapped linearly along the length of the slot 160. The slot 160 can be several millimeters (mm) in length and only a small portion is used for trapping the ions 150. For example, in a QIP system that uses 32 ions as qubits, and where those ions are separated by about 5 microns (µm), only about 150 µm of the overall length of the slot 160 is used.

The ions 150 are trapped above the surface of the surface trap 110 (see e.g., the diagrams 100a and 100b in FIGS. 1A and 1B, respectively) by fields that the electrodes 120 produce. In some examples, the ions 150 may be trapped at about 70 µm or so above the surface of the surface trap 110. In the surface trap 110 shown in the diagram 100c in FIG. 1C (e.g., the HOA trap), the width of the trapping region has been reduced in the middle in the shape of an isthmus (e.g., a narrow portion between the two Y ends) to allow a reasonable amount of focusing of optical beams when brought along the surface of the surface trap 110. That is, by narrowing the width of the surface trap 110 it is possible to have the diverging portion of the optical beam 140 miss the edges of the surface trap 100 and avoid clipping.

With this setup, it may be possible to focus the optical beam 140 (or optical beams 140 as there may be multiple ions 150 along the length of the slot 160) to below about 2 µm radius (e.g., beam waist radius) when the optical beam 140 is brought vertically to the surface through the slot 160 (e.g., the configuration in the diagram 100a in FIG. 1A), and to about 4 µm radius (e.g., beam waist radius) when the optical beam 140 skims along the surface of the surface trap 110 (e.g., the configuration in the diagram 100b in FIG. 1B), without substantial clipping of the beams. As used herein, the term "about" and "approximately' may be used interchangeably to refer to a variation from a nominal value within a range of 1%, 2%, 3%, 5%, 10%, 15%, 20%, or 25%, for example. While the amount of focusing to below about 2 µm radius for the vertical configuration is within a desirable range, the amount of focusing to about 4 µm radius for the horizontal (skimming) configurations may not be within a desirable range but further focusing in this configuration may not be possible as it may result in clipping.

In a typical quantum computing setup that uses surface traps, the spacing between ions 150 in a chain is typically about 3-7 µm (e.g., along the length of the slot 160 or in/out of the plane of the diagrams 100a and 100b in FIGS. 1A and 1B, respectively), so it is important that the individual addressing optical beams 140 feature focused beam waists (e.g., beam waists 145) that have a radius that is less than a 2-3 µm range to ensure accurate addressing with minimal cross-talk. As noted above, while this level of focusing without clipping may be possible in the vertical configuration of the diagram 100a in FIG. 1A, such a level of focusing may be limited in the horizontal (skimming) configuration of the diagram 100b in FIG. 1B.

This disclosure describes aspects of an optical design that may be used to achieve tightly focused optical beams 140 along the trap chain direction (e.g., along the length of the slot 160) to resolve the ions in the chain for individual addressing, while bringing optical beams skimming across the surface of a surface trap chip without clipping.

When bringing the optical beam 140 across the surface of the surface trap 110 (e.g., as in the configuration in the diagram 100b in FIG. 1B) there may not be sufficient numerical aperture (angular access) to focus a round or circular optical beam (e.g., the optical beam 140) along the direction vertical to the surface of the surface trap 150. However, there may be plenty of numerical aperture along the direction parallel to the surface, which happens to be the direction the ions 150 are lined up in. Therefore, it is possible to design and implement an elliptical optical beam that focuses very tightly along the length of the chain, but has a larger focal spot along the direction vertical to the surface trap 110. That is, at the plane where the optical beam 140 is focused (e.g., the plane where the ion 150 sits at the beam waist 145), the optical beam 140 may only need to be focused tightly in the direction of the ions 150 to avoid cross-talk with other optical beams and not so much in the vertical direction to avoid clipping.

Figure 2A:
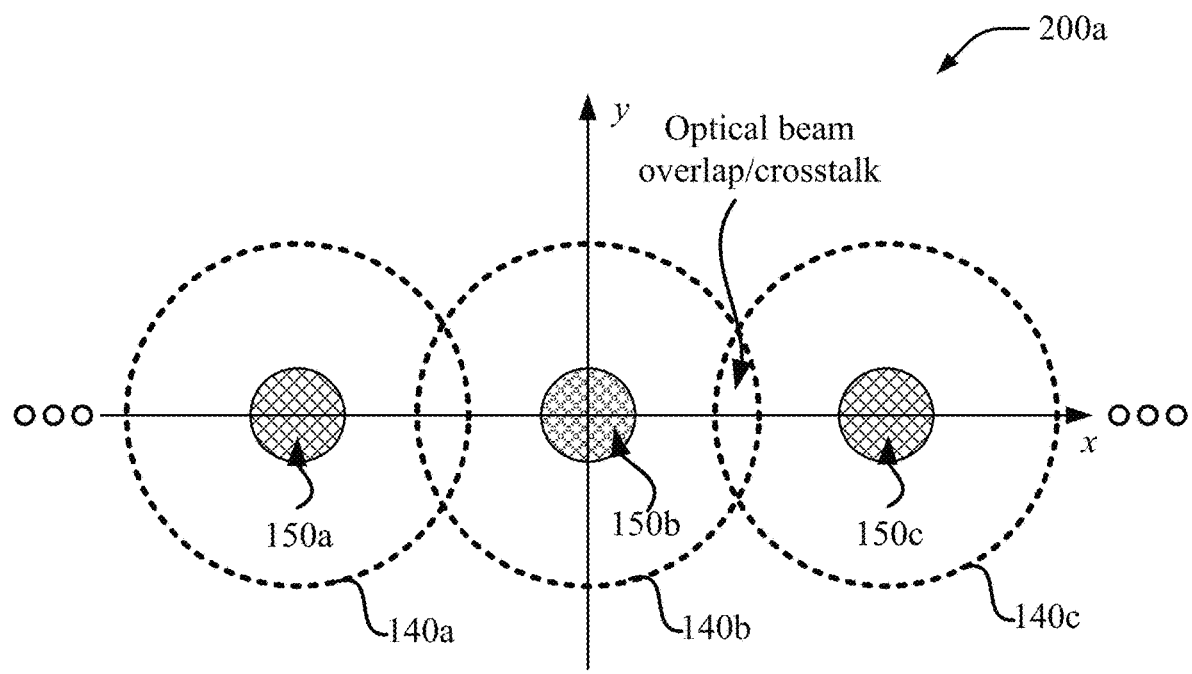
FIGS. 2A and 2B are diagrams that respectively illustrate circular Gaussian optical beams and elliptical Gaussian optical beams in accordance with aspects of this disclosure.
Figure 2B:
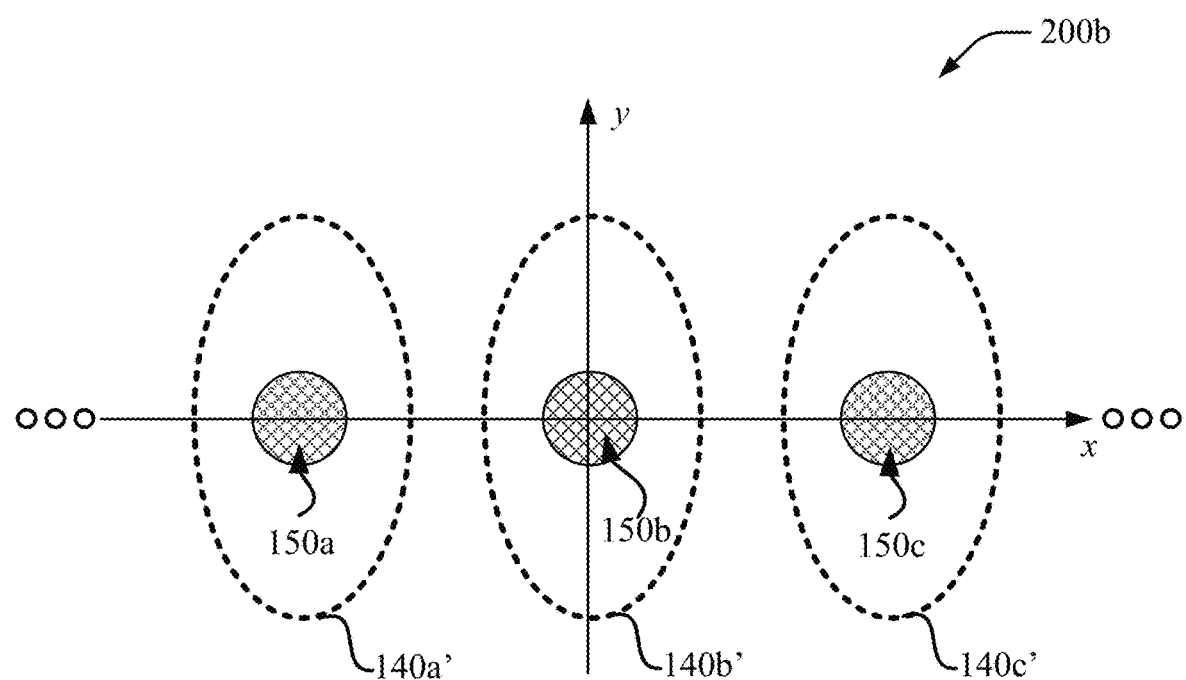

FIGS. 2A and 2B show diagrams 200a and 200b, respectively, that illustrate different optical beams in accordance with aspects of this disclosure. As described above, there may be a limit to the amount of focusing that can be achieved on the optical beam 140 when skimming the optical beam 140 along the surface of the surface trap 110 (e.g., the diagram 100b in FIG. 1B) before the optical beam 140 clips the edges of the surface trap 110. These limits may play out differently depending on the shape of the optical beam.

The diagram 200a shows an example of using round or circular Gaussian optical beams to manipulate the ions 150 in the surface trap 110. In this example, three (3) ions 150 (e.g., ions 150a, 150b, and 150c) are shown trapped along the length of the slot 160 of the surface trap 110 shown in the diagram 100c in FIG. 1C, and separated from each other by a distance of about 3-7 µm. More or fewer ions 150 may be trapped but three have been used for purposes of illustration. Three (3) separate circular Gaussian optical beams 140 (e.g., optical beams 140a, 140b, and 140c), are respectively used to individually manipulate the ions 150. The optical beams 140 are focused such that the beam waist 145 (e.g., the smallest optical beam spot) occurs at the location of their respective ions 150. Because the optical beams 140 in this example are round or circular Gaussian optical beams, the radius of the optical beams is the same in the y direction as in the x direction. The diagram 200a shows that when the amount of focusing is limited (e.g., the spot size cannot be made smaller), the radius of the optical beams 140 at their respective ions 150 may not be small enough and may result in undesirable overlapping and cross-talk. However, the overlapping only occurs in x direction (e.g., along the length of the chain of ions 150).

The diagram 200b shows an example where instead of using circular Gaussian optical beams, each of the ions 150 is individually addressed with an elliptical Gaussian optical beam 140' (e.g., optical beams 140a', 140b', and 140c'). The focusing in they direction (e.g., vertical direction of the surface trap 110) can be looser that the focusing in the x direction (e.g., along the length of the chain of ions 150). Using this approach, the optical beams 140' can have a small enough radius at the beam waist 145 in the x direction to avoid cross-talk and a large or loose enough radius at the beam waist 145 in the y direction to avoid clipping of the optical beams 140' at the edges of the surface trap 110.

Accordingly, by imaging elliptical Gaussian optical beams instead of circular Gaussian optical beams on the ions of a surface trap, the configuration described above that brings the optical beams across the surface of the surface trap can also be effectively used to individually address qubits in the surface trap without cross-talk or clipping.

The present disclosure describes aspects of optical designs that use cylindrical optics (e.g., cylindrical lenses) to generate, produce, or image elliptical Gaussian optical beams, where such optical beams can be used in different applications, including in QIP systems in which the optical beams are brought across the surface of the surface trap to control or manipulate the ions in the surface trap. In addition to their use in QIP systems, these optical designs may find applicability in a wide range of applications.

In a QIP system, it is possible to start with individual addressing optical beams that are relatively large in size (typically 80 μm in radius). Depending on the details of the system, these optical beams need to be reduced by a factor of 40-100 to address an ion in a surface trap with a beam waist of about 0.7-2 μm. That is, the individual addressing optical beams need to be focused to a much smaller beam waist to be of the appropriate size to effectively control a trapped ion (e.g., the ion 150). The standard approach to achieve the appropriate level of magnification, M, of the optical beam is to use one or more telescopes. The term "magnification" may refer to an amount of focusing provided by a telescope, where the term "demagnification" may more specifically refer to an amount of magnification where the beam waist of an optical beam is actually reduced by the telescope (e.g., M<1).

Figure 3:
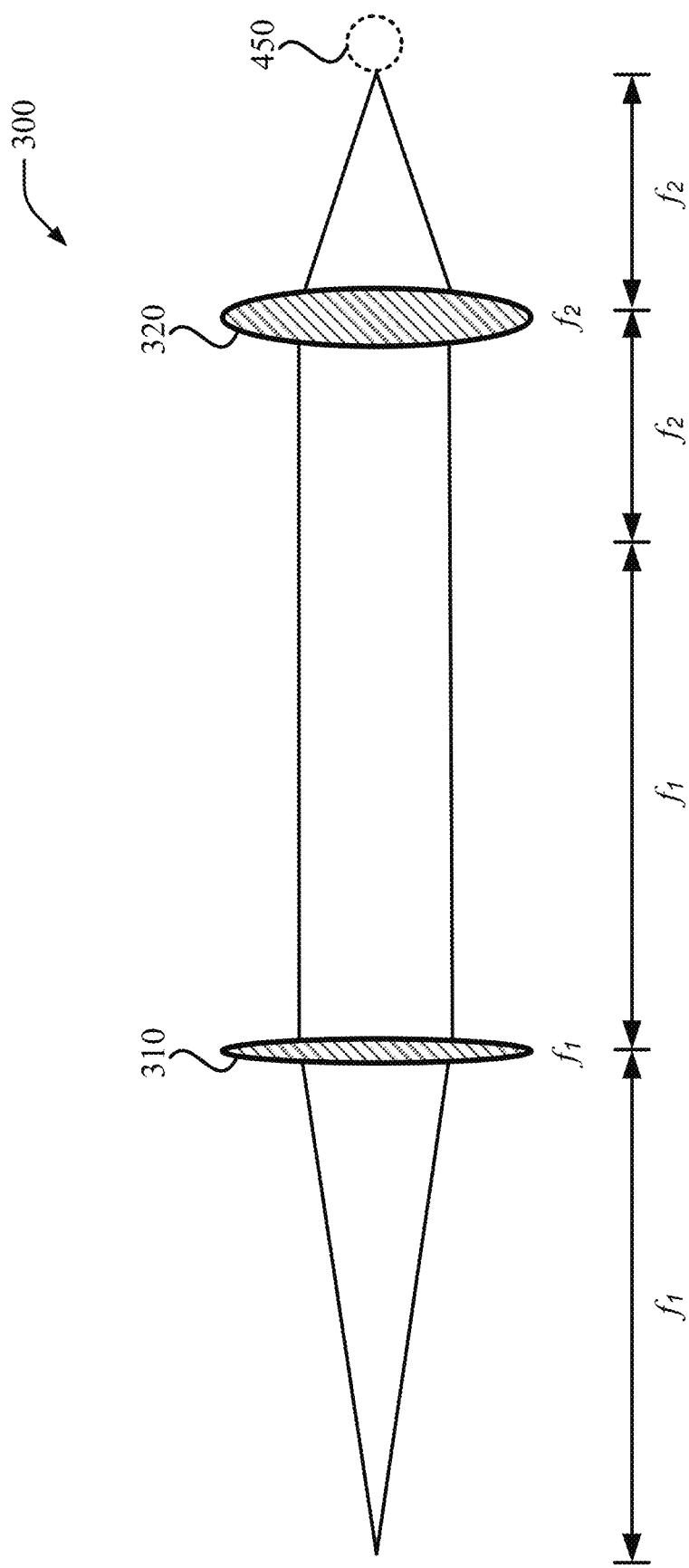
FIG. 3 is a diagram that illustrates a basic arrangement of a telescope.

FIG. 3 illustrates a basic arrangement of an optical system, in this case, a telescope 300. In this example, the telescope 300 includes a first optical component 310 and a second optical component 320. In one example, the telescope 300 may be used to focus an optical beam (e.g., the optical beam 140) onto an ion 450 in a surface trap (e.g., the surface trap 110). The first optical component 310 can be a first lens and the second optical component can be a second lens. The two lenses have different focal lengths, with the first lens having a focal length $f_1$ and the second lens having a focal length $f_2$. The first lens is placed from a source object (e.g., source of the large sized individual addressing optical beam) with a spacing of $f_1$, and the second lens is placed from the first lens by a spacing of $f_1+f_2$. The image is formed a distance $f_2$ from the second lens with a demagnification, m, given by:

$$m = \frac{1}{M} = \frac{f_2}{f_1}.$$

As mentioned above, more than one telescope may be used to achieve the appropriate magnification or demagnification at the desired distance or location in the optical system.

To be able to take an individual addressing optical beam of large size and focus it on an ion such that the optical beam at the ion is an elliptical Gaussian optical beam (e.g., the optical beams 140' in the diagram 200b in FIG. 2B) that avoids cross-talk with other optical beams and also avoids clipping with the surface trap, an optical or imaging system would need to have two different magnifications along the horizontal and vertical directions (e.g., x direction, y direction). One way to achieve that is to use different cylindrical lenses with different magnifications for each direction (horizontal and vertical).

If two independent pairs of cylindrical lenses are used, one pair for the vertical direction and one pair for the horizontal direction (e.g., the x direction and the y direction in the diagrams 200a and 200b in FIGS. 2A and 2B, respectively), it is possible to construct a telescope or optical system with two different magnifications, or essentially two coincident telescopes where one has a magnification in one direction and the other has a magnification in an orthogonal direction. The first telescope includes two optical components, the first being a first cylindrical lens with focal length $f_1$ and the second being a second cylindrical lens with focal length $f_2$. The second telescope includes two optical components, the first being a first cylindrical lens with focal length $f_1'$ and the second being a second cylindrical lens with focal length $f_2'$. In order for the two independent pairs of cylindrical lenses to form the image at the same location (e.g., at the beam waist 145 where the ion 150 sits), it is also important that the total length of the telescopes in the horizontal and vertical directions are the same. These constraints can be formulated as follows:

$$M = \frac{f_1}{f_2} = \frac{1}{m},$$

$$M' = \frac{f_1'}{f_2'} = aM = \frac{1}{m'},$$

$$f_1 + f_2 = f_1' + f_2'.$$

The first two conditions set the magnifications of the two telescopes, and the final condition ensures that the image is formed at the same plane (e.g., at the plane where the ion 150 sits) for the two directions. The parameter a defines the ratio of the two magnifications (e.g., an elliptical ratio), which will eventually lead to the ellipticity of the resulting Gaussian optical beam. Solving these equations lead to the relationship between the focal lengths of the pairs of cylindrical lenses as follows:

$$f_1 = \frac{1 + 1/aM}{1 + 1/M} f_1'$$

$$f_2 = \frac{a + 1/M}{1 + 1/M} f_2'.$$

For large magnifications M and aM, such that M, aM>>1, then $$f_1 \approx f_1'$$

$$f_2 \approx af_1'$$

In this limit, the first cylindrical lens of the first telescope and the first cylindrical lens of the second telescope (e.g., the first stages of the two telescopes) have essentially the same focal length and can be replaced by a single spherical lens of focal length $f_1 \approx f_1'$. Then, the second cylindrical lens of the first telescope and the second cylindrical lens of the second telescope have different focal lengths $f_2'$ and $af_2'$ for the horizontal direction (e.g., tight focus in the x direction) and vertical direction (e.g., loose focus in the y direction), respectively.

Figure 4A:
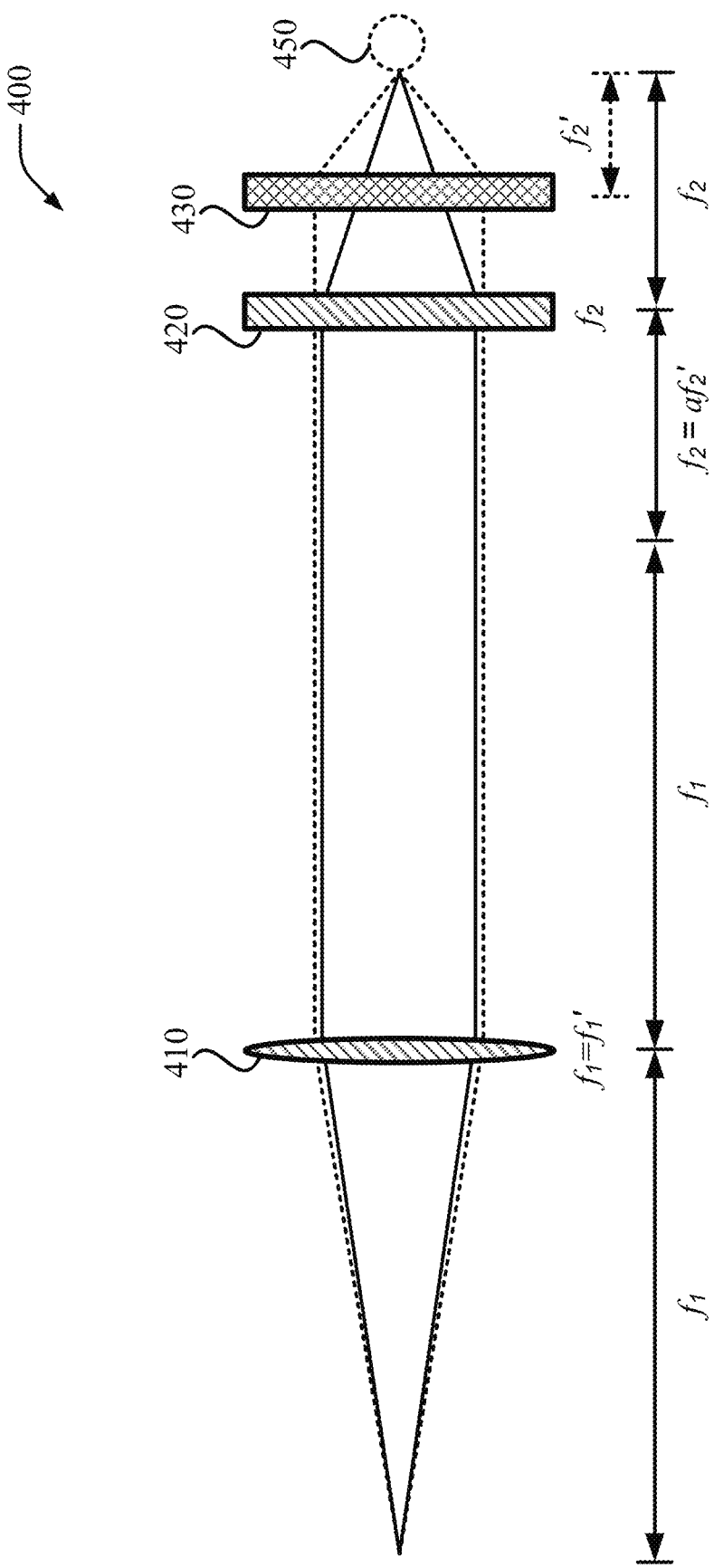
FIG. 4A is a diagram that illustrates an example of a basic design of an optical system for imaging elliptical optical beams using a common spherical lens and two cylindrical lenses aligned orthogonal to each other in accordance with aspects of this disclosure.
Figure 4B:
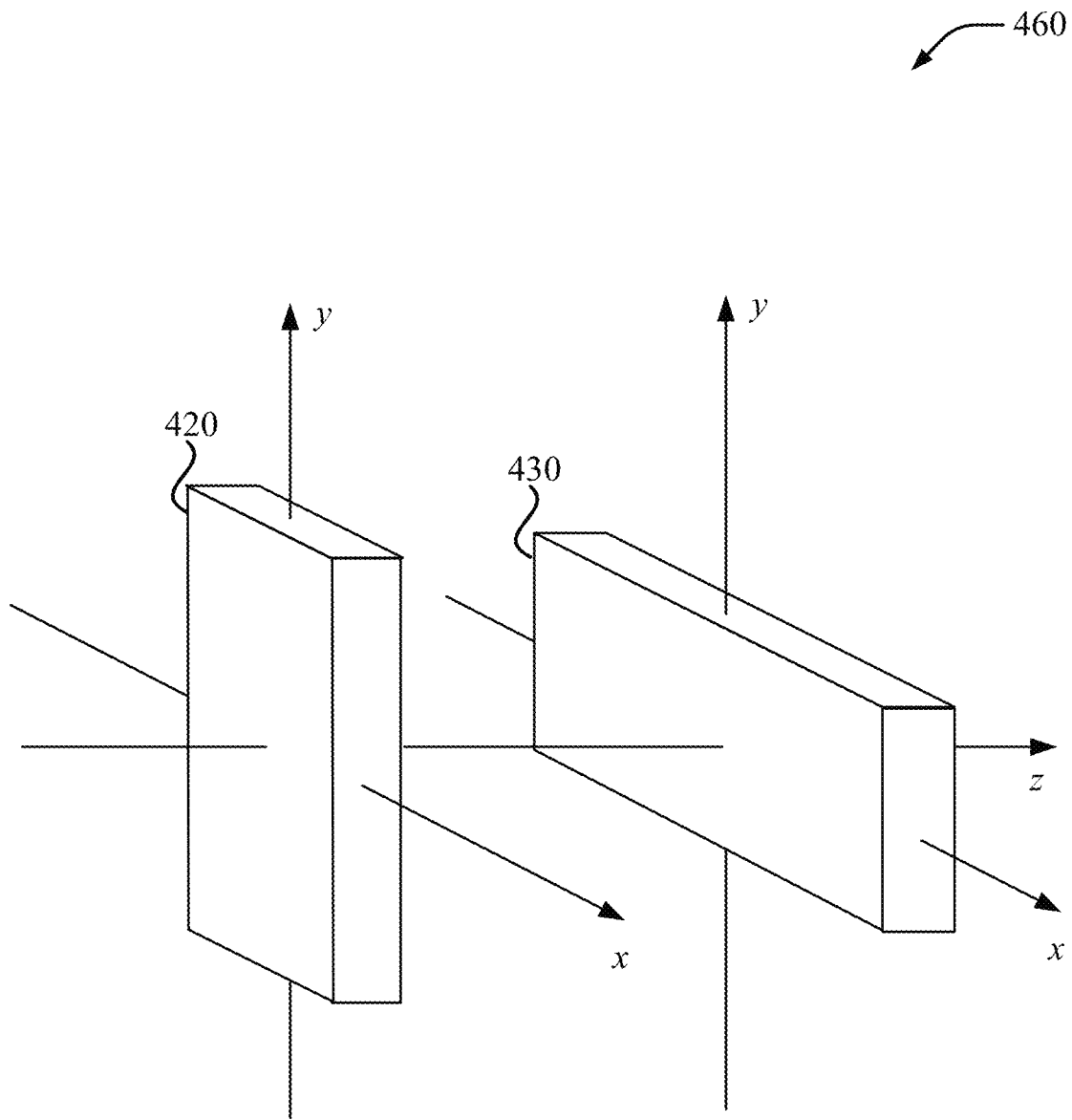
FIG. 4B is a diagram that illustrates the orthogonal alignment of the two cylindrical lenses in FIG. 4A in accordance with aspects of this disclosure.
Figure 4C:
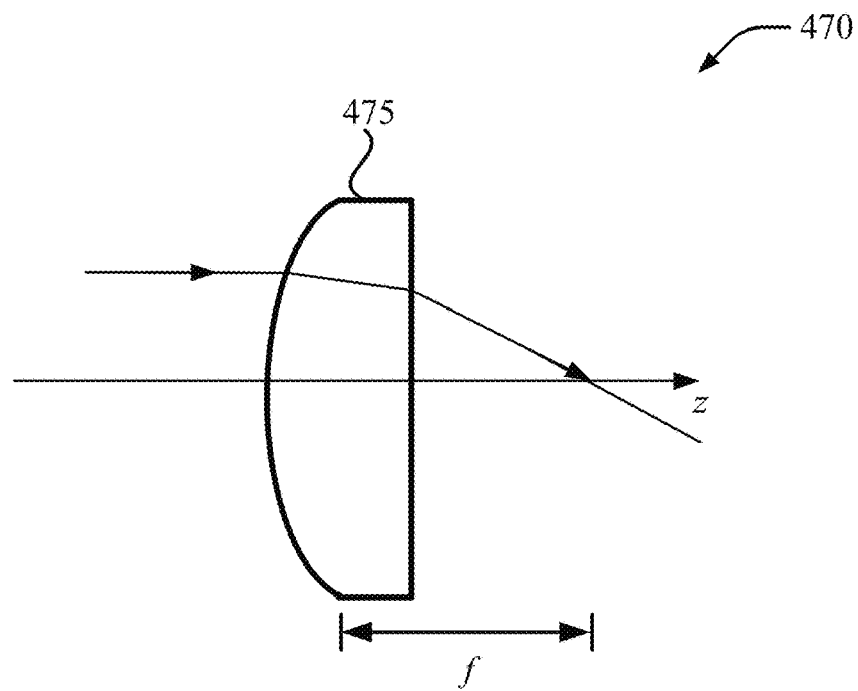
FIGS. 4C and 4D are diagrams that respectively illustrate positive and negative cylindrical lenses in accordance with aspects of this disclosure.
Figure 4D:
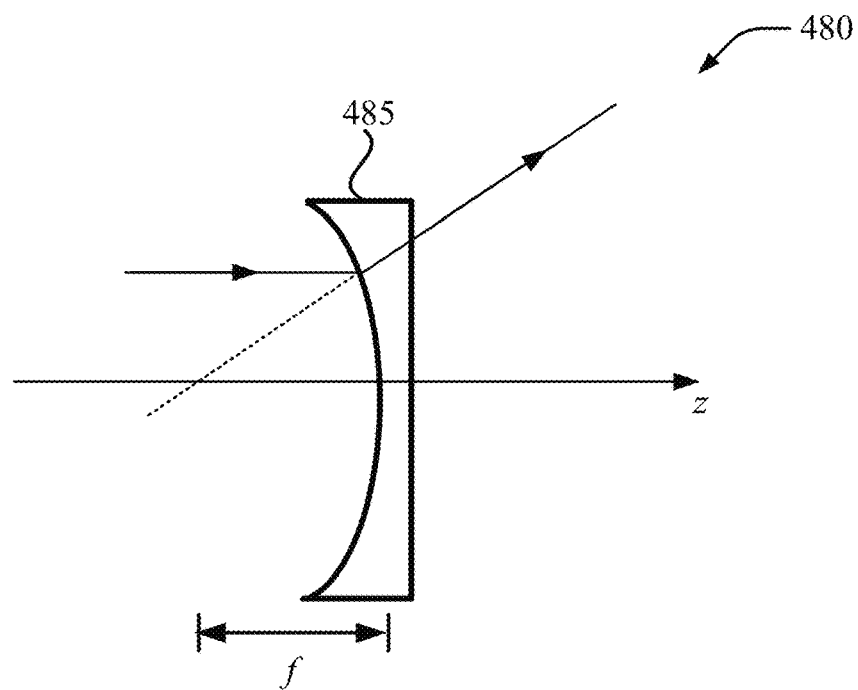

FIG. 4A illustrates an example of a basic design of an optical system 400 for imaging elliptical optical beams using a common spherical lens and two cylindrical lenses aligned orthogonal to each other. The optical system 400 is an implementation of the coincident telescopes described above. For example, the optical system 400 includes a first optical component 410 that can be a spherical lens, a second optical component 420 that can be a first cylindrical lens with magnification along a first direction (e.g., y direction), and a third optical component 430 that can be a second cylindrical lens with magnification along a second direction orthogonal to the first direction (e.g., x direction). In this regard, FIG. 4B shows a diagram 460 that illustrates the orthogonal alignment of the two cylindrical lenses (e.g., optical components 420 and 430) of the optical system 400, where one follows the other along a propagation direction, z direction. The diagram 460 is merely to illustrate the concept that the lenses are orthogonal or perpendicular and is not intended to describe the size and/or shape of the cylindrical lenses. In addition, FIG. 4C shows a diagram 470 that illustrates one type of cylindrical lens, a positive cylindrical lens 475 with a focal length f along the z direction, and FIG. 4D shows a diagram 480 that illustrates another type of cylindrical lens, a negative cylindrical lens 485 with focal length f along the z direction. The positive cylindrical lens 475 is a cylindrical lens with a positive focal length that focuses or condenses light (e.g., optical beams) in one dimension or one direction. The negative cylindrical lens 485 is a cylindrical lens with a negative focal length (e.g., a concave lens) that diverges light (e.g., optical beams) in one dimension or direction. The first cylindrical lens (e.g., the second optical component 420) and the second cylindrical lens (e.g., the third optical component 430) may both be positive cylindrical lenses like the positive cylindrical lens 475 described above in connection with the diagram 470 in FIG. 4C.

The combination of the spherical lens and the first cylindrical lens in the optical system 400 provides the functionality of one of the coincident telescopes and focuses or images an optical beam (dotted line) loosely in a vertical or y direction, while the combination of the spherical lens and the second cylindrical lens provides the functionality of the other one of the coincident telescopes and focuses or images an optical beam (solid line) tightly in a horizontal or x direction. The optical system 400 ensures that the image is formed at the same plane (e.g., at the plane where an ion 450 sits) for the two directions. Thus, a real image can be formed by the optical system 400 at the point or plane where the ion 450.

There may be some advantages of forming a real image by using positive cylindrical lenses (e.g., the optical components 420, 430). They can be used for several practical functions. For example, by forming a real image using positive cylindrical lenses it is possible to use diagnostic tools (e.g., cameras or beam profilers) to verify the quality of the cylindrical imaging optics or the overall quality of the optical beams (e.g., image quality measurement, analysis). Diffraction effects from the use of positive cylindrical lenses may be limited but this may be verified by using diagnostic tools. It is also possible to add other optical components or elements such as spatial filters (e.g., to eliminate scatter, aberrations), place apertures at the real image plane, or use field lenses. A field lens is a positive-powered lens or group of lenses that comes after the objective lens and before the image plane.

Using the design described above in connection with the optical system 400 in FIG. 4A, from a symmetrical Gaussian optical beam as input, an almost ideal elliptical Gaussian optical beam can be created for which the beam waist location along the two orthogonal directions coincide, eliminating any astigmatism in the optical beam that is not desirable. In another implementation, the input optical beam to the optical system 400 could be already an elliptical Gaussian optical beam but the optical system 400 provides magnifications that change the equatorial and polar Gaussian radii of the input optical beam to a more suitable elliptical Gaussian optical beam based on the system requirements (e.g., spacing between ions, size of the ions, size of the surface trap, etc.).

As an example, it is possible to choose the demagnification of the loose direction (y direction) such that M=8 and that of the tight direction (x direction) such that aM=40, and the ellipticity ratio is therefore a=5. In this case, the focal lengths of the cylindrical lens can be chosen to be $f_2'$=15 mm and $af_2'$=75 mm, and for the spherical lens to be $f_1$=600 mm. It is to be understood that other implementations are possible and this example is provided by way of illustration and not of limitation.

Figure 5A:
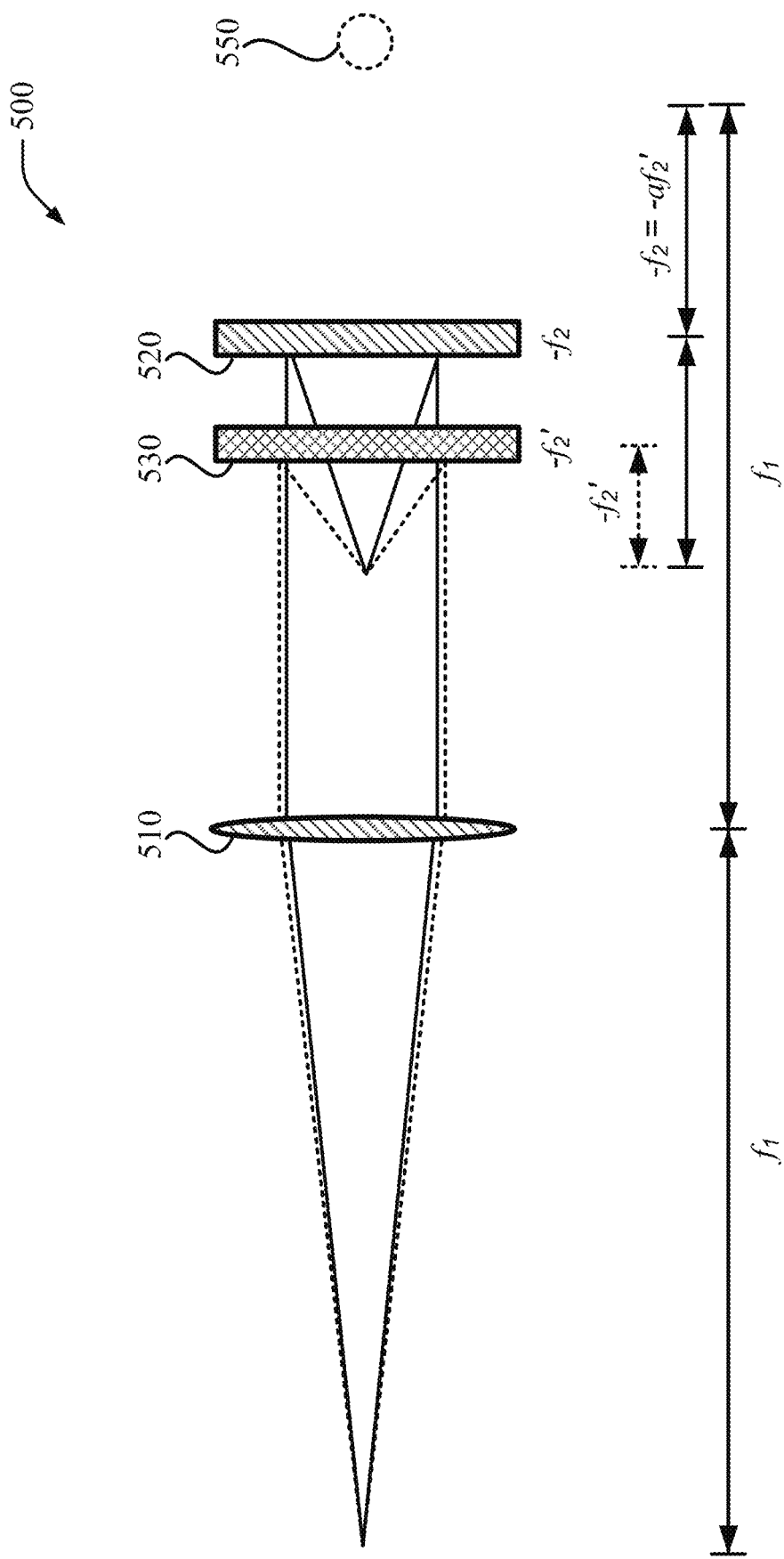
FIG. 5A is a diagram that illustrates an example of creating a virtual image using cylindrical lenses with negative focal lengths (concave lenses) in accordance with aspects of this disclosure.

There may be some variations to the optical system 400 shown in FIG. 4A. For example, the two cylindrical lenses can be formed using negative cylindrical lenses such as the negative cylindrical lens 485 described above in the diagram 480 in FIG. 4D. One such example is described in more detail with respect to an optical system 500 shown in FIG. 5A. The optical system 500 may include a first optical component 510 that can be a spherical lens, a second optical component 520 that can be a first cylindrical lens, and a third optical component 530 that can be a second cylindrical lens, with both cylindrical lenses being negative cylindrical lenses.

Figure 5B:
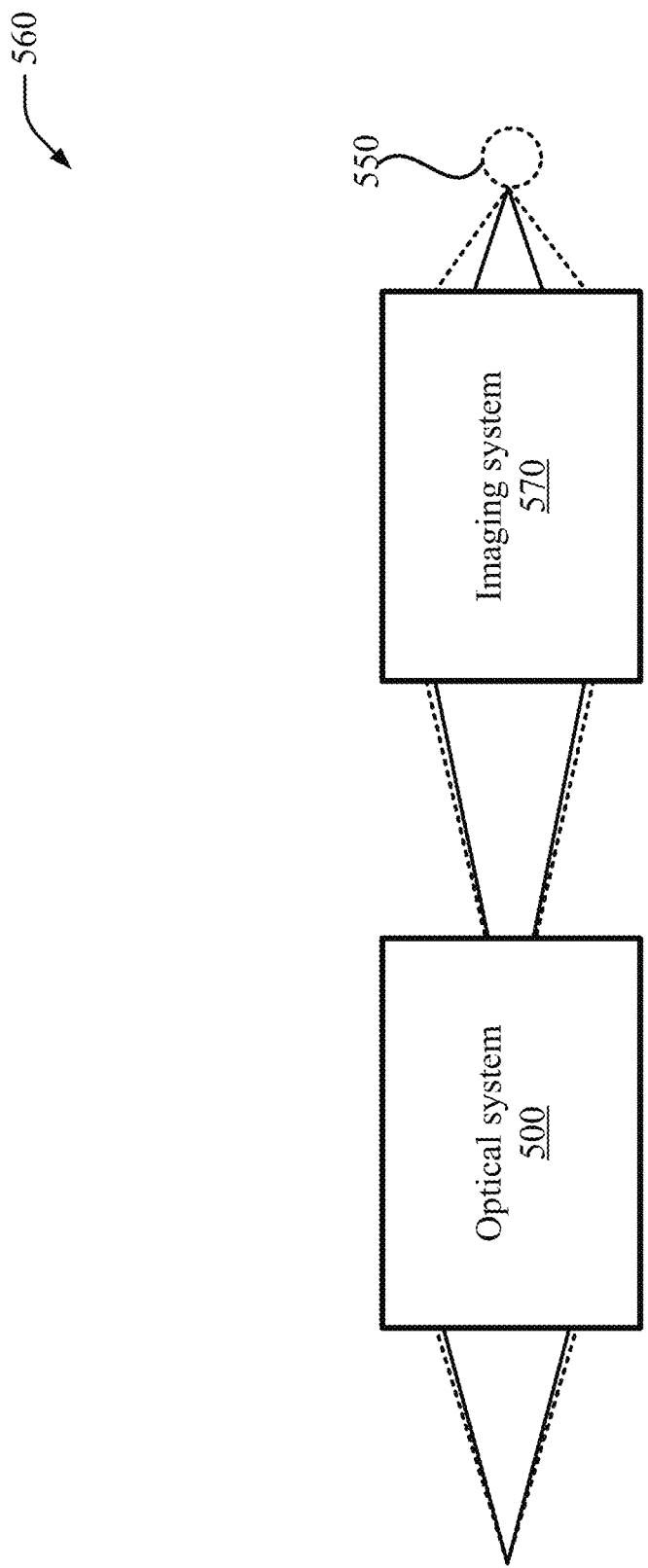
FIG. 5B is a diagram that illustrates an example of an imaging system for re-imaging an optical beam in accordance with aspects of this disclosure.

In this case, a virtual image, instead of a real image, is formed before the two cylindrical lenses where their focal lengths coincide. Like the optical system 400, in the optical system 500 the combination of the spherical lens and the first cylindrical lens in the optical system 400 provides the functionality of one coincident telescope and virtually focuses or images an optical beam (dotted line) loosely in a vertical or y direction, while the combination of the spherical lens and the second cylindrical lens provides the functionality of the other coincident telescope and virtually focuses or images an optical beam (solid line) tightly in a horizontal or x direction. The optical system 500 ensures that the virtual image is formed at the same plane for the two directions. This virtual image point can be re-imaged by another imaging system (another telescope, or an imaging lens) with adequate magnification to form a real image at an ion 550 in a surface trap for control of the ion. FIG. 5B shows a diagram 560 with an imaging system 570 following the optical system 500 to form a real image at the ion 550.

The optical system 500 may have several advantages. For example, the overall length of the optical system can be made shorter. A drawback of this type of optical system is that an imaging system (e.g., the imaging system 570) is needed to relay the virtual image point onto the ions for creating a real image point for the addressing optical beams. This is done by the final projection lens and therefore another imaging system may be needed anyway (e.g., in the optical system 400) to focus the beam in the appropriate location where the ion is located. As such, the use of negative cylindrical lenses may not carry additional hardware requirements.

In another aspect of both the optical system 400 and the optical system 500, the first optical component 410 of the optical system 400 and the first optical component 510 of the optical system 500, can be spherical lenses with focal length $f_1$ that could be realized with a compound lens with several elements. Specifically, the spherical lens can be created with a slow (long focal length) negative lens followed by a faster (shorter focal length) positive lens with finite separation between them, such that the control of the separation between them will create a net positive lens, but the focal length can be tuned by controlling the separation between the slow negative lens and the faster positive lens. In this case, the overall magnification of the optical system (e.g., the optical system 400 or the optical system 500) can be modified by making this adjustment. Lens speed refers to the numerical aperture given by the ratio of the lens radius to focal length of the lens, with a "fast lens" able to achieve the same exposure in a shorter time than other lenses, and conversely, a "slow lens" having a smaller numerical aperture delivering less light intensity and requiring a longer time to do so than other lenses.

Additional benefits of the techniques described in this disclosure are that in a QIP system, multiple tones are used to modulate the frequency of the optical beams (e.g., laser beams) used for individually addressing the qubits. As noted above, these optical beams may need to be magnified or focused differently in different directions to achieve elliptical Gaussian optical beams to individually addressed trapped ions (e.g., qubits) without causing cross-talk or clipping. By using acousto-optic modulators (AOMs) in the QIP system, these tones cause an optical beam to "diffract" from the AOMs at different angles. When these modulated optical beams are focused back on the ions, the different tones converge at the ions at an angle. For tightly focused optical beams, such as the ones described above, these angles tend to be quite large, leading to issues related to (1) insufficiently-overlapping optical beams arriving at the ion, or (2) tight alignment requirements. In some cases, the angle leads to undesired effects such as sensitivity to the optical phase (interferometric effects) imprinted on the qubits themselves. In current implementations, the different tones diffract the optical beams in the direction vertical to the trap surface (e.g., the y direction). Since the focus is dramatically relaxed in the vertical direction, the optical beams are stretched more, and the angle at which the different diffracted optical beams converge at the ion is also dramatically reduced. This leads to easier optical alignment and more flexible overlap of the diffracted optical beams at the respective ion.

Figure 6:
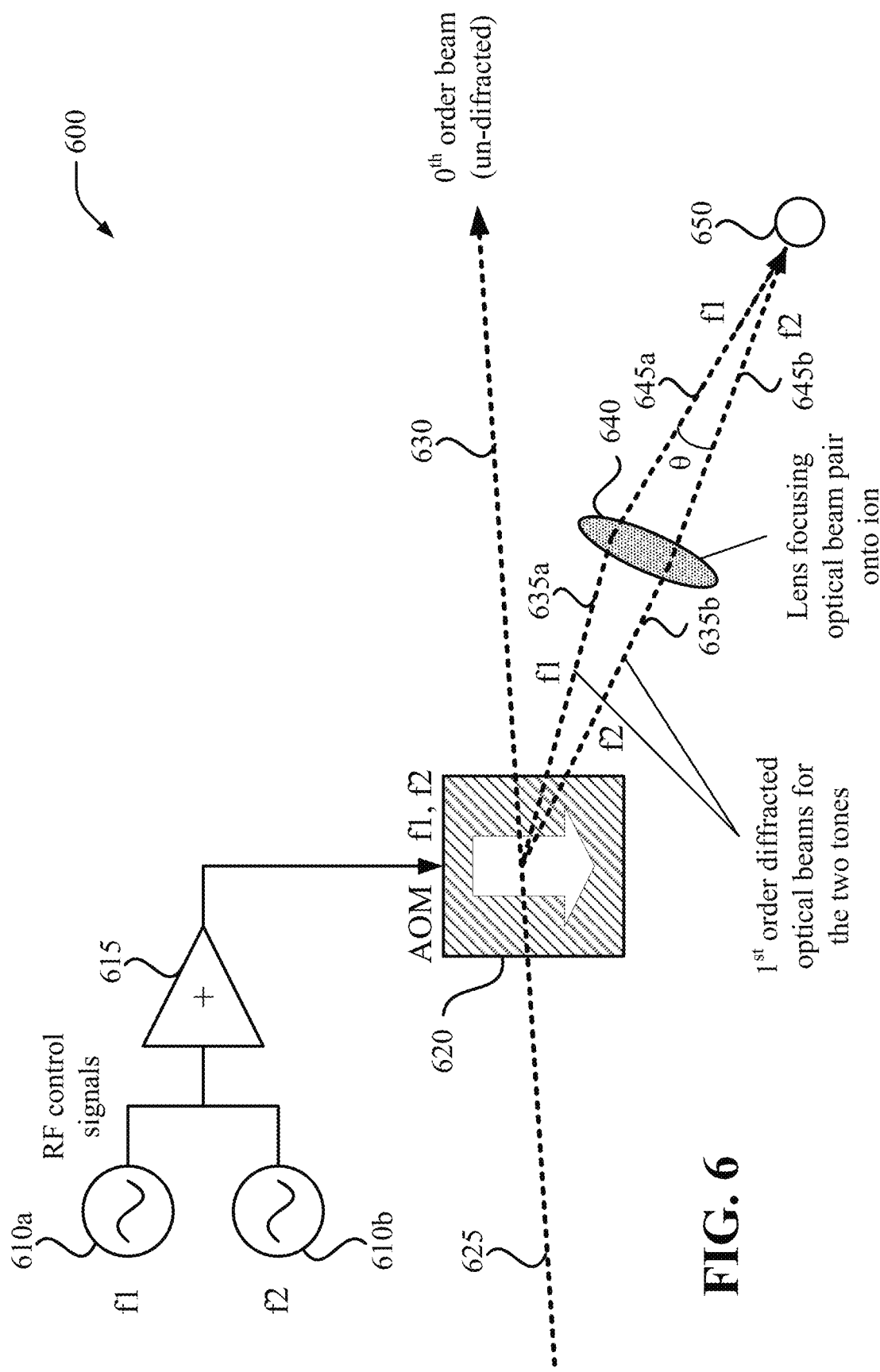
FIG. 6 is a diagram that illustrates an example of frequency dependence of diffracted optical beams using an acousto-optic modulator (AOM) in connection with imaging elliptical optical beams in accordance with aspects of this disclosure

FIG. 6 shows a diagram 600 that illustrates an example of frequency dependence of diffracted optical beams as described above. In this example, a first RF signal (e.g., a modulated signal) is generated by RF generator 610a based on frequency or tone f1 and a second RF signal is generated by RF generator 610b based on frequency or tone f2. These two signals are combined by adder 615 and applied to AOM 620. The AOM 620 may be a multi-channel AOM with each channel operating independently and receiving its own pair of RF signal. Each channel of the AOM may be associated with a separate individually addressing optical beam (e.g., a separate optical beam 140).

The AOM 620 receives an incident optical beam 625, part of which is not diffracted (e.g., un-diffracted optical beam 630 produced by $0^{th}$ order diffraction). On the other hand, two modulated optical beams are generated from the incident optical beam 625 by diffraction at the AOM 620 (e.g., diffracted optical beam 635a for tone f1 and diffracted optical beam 635b for tone f2, both produced by $1^{st}$ order diffraction—higher order diffracted optical beams can be spatially filtered). The two diffracted optical beams are diffracted at different angles and do not co-propagate. Accordingly, the two diffracted optical beams need to be focused by optical component 640 (e.g., focused optical beam 645a for f1 and focused optical beam 645b for f2) onto a respective ion or atom 650 in a lattice, crystal, or chain formed in an trap such as the surface trap 110 described above. The refocused optical beams do not arrive at the ion 650 in the same propagating direction (e.g., are not co-propagating) and this can cause errors in the quantum state manipulations. As mentioned above, however, this issue can be at least partially addressed by using the techniques described herein. That is, aspects of the optical system 400 or the optical system 500 may be implemented in the optical component 640. For example, the optical component 640 may be configured to enable different magnifications or focusing in different directions, which allows for a looser focusing in a y direction, e.g., a vertical direction relative to the surface of a surface trap, and more tight focusing in an x direction, e.g., a horizontal or parallel direction relative to the surface of the surface trap. Since the focus can be dramatically relaxed in the vertical direction, the optical beams are stretched more, and the angle at which the different diffracted optical beams converge at the ion is also dramatically reduced and thus the optical beams (e.g., the optical beams 645a and 645b) arriving at the ion 650 are closer to being co-propagating.

An example of the use of the AOM in connection with the use of different magnifications can be illustrated by the example of the telescope 300 in FIG. 3. In this example, the telescope 300 can be used to illustrate having two optical beams come out of source (e.g., similar to the optical beams 635a and 635b diffracted from the AOM 620) at different angles and then converge at a steep angle to the right of the telescope 300 (e.g., similar to the optical beams 645a and 645b converging at the ion 650). Thus, by having the converging angle be much steeper than the initial diverging angle there is a demagnification provided by the telescope 300. When the AOM 620 is a multi-channel AOM, the different channels have a certain separation. In some examples, this separation can be about 450 μm. As mentioned above, the spacing between ions (e.g., the ions 150 in the surface trap 110) in a chain is typically about 3-7 μm, with 4.5 μm being within this range. An optical system such as the telescope 300, or the optical systems 400 and 500, could be used (e.g., as part of the optical component 640) to provide an overall demagnification by a factor of about 100 (e.g., 450 μm channel spacing/4.5 μm ion spacing). In such a case, the optical beams diffracted from the AOM 620 come out at an initial divergence angle and then they converge on their respective ions at an angle that is about 100 times larger. For example, if the initial divergence angle is about 0.2° then the convergence angle is about 20°, which could be a problem because the converging optical beams are not close to being co-propagating.

The two tones (e.g., the optical beams optical beams 635a and 635b) diffracted from the AOM 620 come out in a direction perpendicular to the direction the optical beams need to be squeezed or tightened to individually address the ions. Thus, if the optical systems 400 and 500 are used instead, the optical beams can be squeezed in an x direction (see e.g., FIG. 2B) and the two tones come out in a y direction and in the y direction there can be a magnification that is a times smaller, where a is the parameter that defines the ratio of the two magnifications as described above. If the ellipticity ratio is selected such that a=5, as in the example described above, then instead of having a convergence angle of 20° it may be possible to have a convergence angle of 4° (20°/5). Therefore, an added benefit of the ability to control magnification in different directions to image elliptical optical beams is that in the context of AOM geometry, the various optical beams diffracted from the AOM (e.g., the tones) occur in the direction where the optical beams are not being tightened much and in that direction the problem of the angle of convergence of the optical beams can be more readily suppressed.

Figure 7:
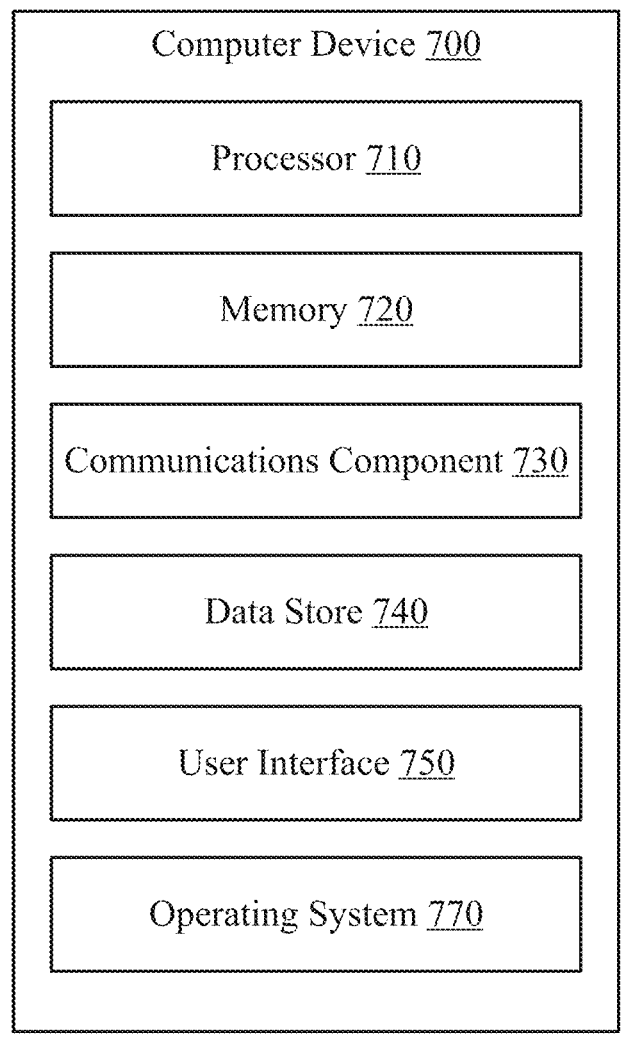
FIG. 7 is a diagram that illustrates an example of a computer device in accordance with aspects of this disclosure.

The use of an AOM may cause, in some instances, aberrations and/or scattering to the optical beams. As described above in connection with the optical system 400, it is possible to add other optical components or elements such as spatial filters, place apertures at the real image plane, or use field lenses. These other optical components may be part of the optical component 640, may be added somewhere between the optical component 640 and a real image plane on which the ion 650 sits, or may be added at the real image plane, for example. If the Referring now to FIG. 7, illustrated is an example computer device 700 in accordance with aspects of the disclosure. The computer device 700 can represent a single computing device, multiple computing devices, or a distributed computing system, for example. The computer device 700 may be configured as a quantum computer (e.g., a quantum information processing (QIP) system), a classical computer, or a combination of quantum and classical computing functions. For example, the computer device 700 may be used to process information using quantum algorithms based on trapped ion technology and may therefore implement some of the techniques described herein for generating elliptical optical beams using cylindrical optics or lenses to control trapped ions. A generic example of the computer device 700 as a QIP system that can implement the techniques described herein is illustrated in an example shown in FIGS. 8A and 8B.

In one example, the computer device 700 may include a processor 710 for carrying out processing functions associated with one or more of the features described herein. For example, the processor 710 may be configured to control, coordinate, and/or perform aspects of manipulating quantum information stored in an ion or atom by generating elliptical optical beams using cylindrical optics or lenses. In an aspect, the processor 710 may include a surface trap such as the surface trap 110 described above, where the ions 150 trapped in the surface trap 110 are used to perform at least some of the functions of the processor 710. The processor 710 may include a single or multiple set of processors or multi-core processors. Moreover, the processor 710 may be implemented as an integrated processing system and/or a distributed processing system. The processor 710 may include a central processing unit (CPU), a quantum processing unit (QPU), a graphics processing unit (GPU), or combination of those types of processors. In one aspect, the processor 710 may refer to a general processor of the computer device 700, which may also include additional processors 710 to perform more specific functions.

In an example, the computer device 700 may include a memory 720 for storing instructions executable by the processor 710 for carrying out the functions described herein. In an implementation, for example, the memory 720 may correspond to a computer-readable storage medium that stores code or instructions to perform one or more of the functions or operations described herein. In one example, the memory 720 may include instructions to perform aspects that control the generation of elliptical optical beams using cylindrical optics or lenses. Just like the processor 710, the memory 720 may refer to a general memory of the computer device 700, which may also include additional memories 720 to store instructions and/or data for more specific functions.

Further, the computer device 700 may include a communications component 730 that provides for establishing and maintaining communications with one or more parties utilizing hardware, software, and services as described herein. The communications component 730 may carry communications between components on the computer device 700, as well as between the computer device 700 and external devices, such as devices located across a communications network and/or devices serially or locally connected to computer device 700. For example, the communications component 730 may include one or more buses, and may further include transmit chain components and receive chain components associated with a transmitter and receiver, respectively, operable for interfacing with external devices.

Additionally, the computer device 700 may include a data store 740, which can be any suitable combination of hardware and/or software, that provides for mass storage of information, databases, and programs employed in connection with implementations described herein. For example, the data store 740 may be a data repository for operating system 760 (e.g., classical OS, or quantum OS). In one implementation, the data store 740 may include the memory 720.

The computer device 700 may also include a user interface component 750 operable to receive inputs from a user of the computer device 700 and further operable to generate outputs for presentation to the user or to provide to a different system (directly or indirectly). The user interface component 750 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 750 may include one or more output devices, including but not limited to a display, a speaker, a haptic feedback mechanism, a printer, any other mechanism capable of presenting an output to a user, or any combination thereof.

In an implementation, the user interface component 750 may transmit and/or receive messages corresponding to the operation of the operating system 760. In addition, the processor 710 may execute the operating system 760 and/or applications or programs, and the memory 720 or the data store 740 may store them.

When the computer device 700 is implemented as part of a cloud-based infrastructure solution, the user interface component 750 may be used to allow a user of the cloud-based infrastructure solution to remotely interact with the computer device 700.

Figure 8A:
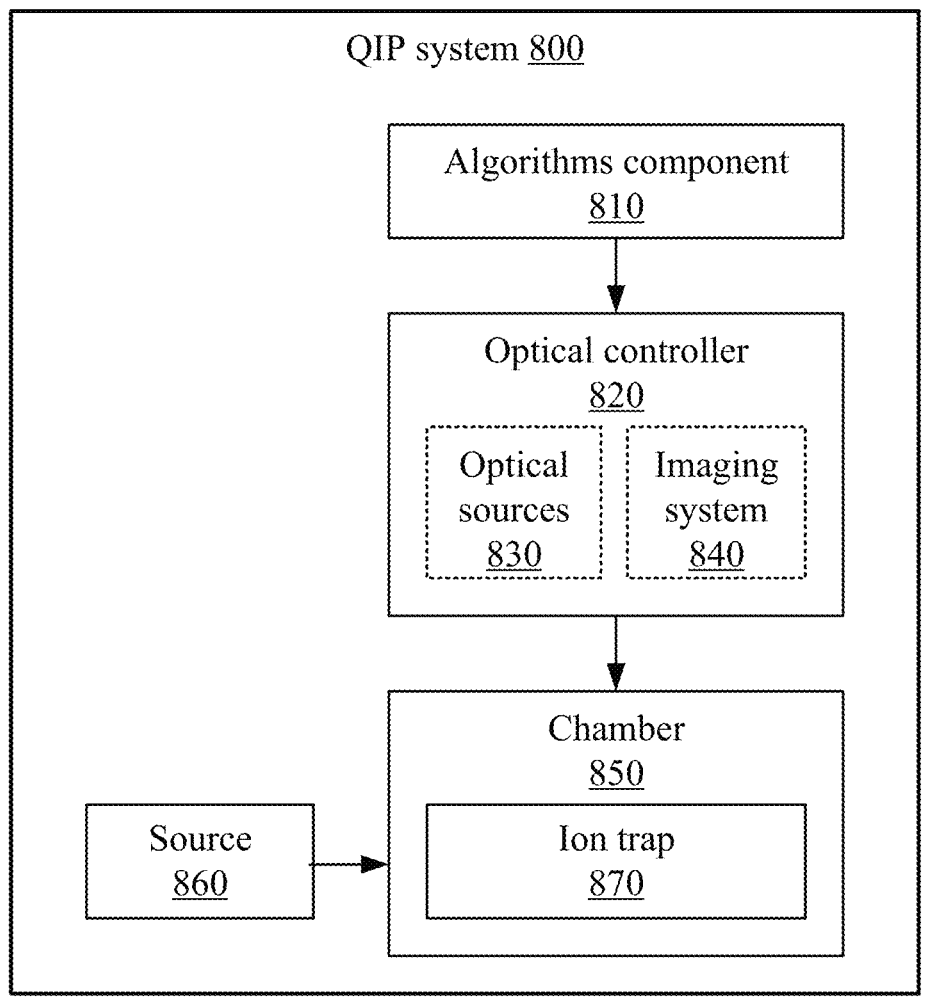
FIG. 8A is a block diagram that illustrates an example of a quantum information processing (QIP) system in accordance with aspects of this disclosure.

FIG. 8A is a block diagram that illustrates an example of a QIP system 800 in accordance with aspects of this disclosure. The QIP system 800 may also be referred to as a quantum computing system, a computer device, a trapped ion quantum computer, or the like. In an aspect, the QIP system 800 may correspond to portions of a quantum computer implementation of the computer device 700 in FIG. 7.

Figure 8B:
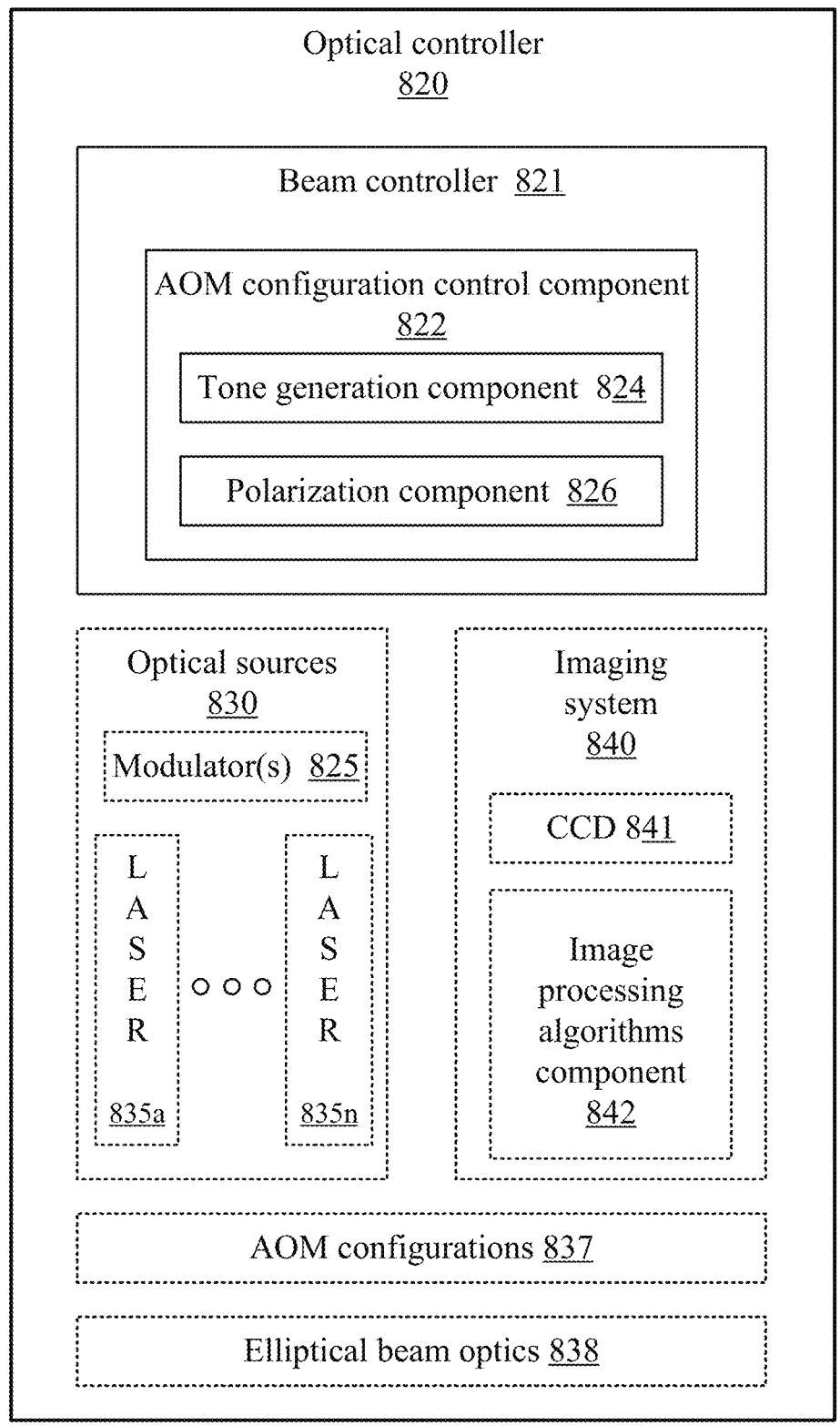
FIG. 8B is a block diagram that illustrates an example of an optical controller in accordance with aspects of this disclosure.

The QIP system 800 can include a source 860 that provides atomic species (e.g., a flux of neutral atoms) to a chamber 850 having an ion trap 870 that traps the atomic species once ionized (e.g., photoionized) by an optical controller 820 (see e.g., FIG. 8B). The surface trap 110 described above may be an example of the ion trap 870. Optical sources 830 in the optical controller 820 may include one or more laser sources that can be used for ionization of the atomic species, control (e.g., phase control) of the ions, for fluorescence of the ions that can be monitored and tracked by image processing algorithms operating in an imaging system 840 in the optical controller 820, and/or to perform manipulations and/or generation of elliptical optical beams using cylindrical optics or lenses as described in this disclosure. In an aspect, the optical sources 830 may be implemented separately from the optical controller 820.

The imaging system 840 can include a high resolution imager (e.g., CCD camera) for monitoring the atomic species while they are being provided to the ion trap 870 or after they have been provided to the ion trap 870. The imaging system 840 may also be used to perform diagnostics or other operations such as image quality measurement and analysis operations on optical systems such as the optical systems 400 and 500, for example. In an aspect, the imaging system 840 can be implemented separate from the optical controller 820, however, the use of fluorescence to detect, identify, and label atomic ions using image processing algorithms may need to be coordinated with the optical controller 820. In another aspect, the imaging system 840 can include imaging optics that can be used to direct photons scattered by the ions, wherein the photons can be used to obtain information such as the location of the ions and/or the quantum state of a qubit upon measurement. The photons may be directed to different types of detectors including imagers and/or single photon detectors such as photomultiplier tubes, for example. The photons may be directed to the detectors using optical fibers and/or other types of optical waveguides.

The QIP system 800 may also include an algorithms component 810 that may operate with other parts of the QIP system 800 (not shown) to perform quantum algorithms or quantum operations, including single qubit operations or multi-qubit operations as well as extended quantum computations. As such, the algorithms component 810 may provide instructions to various components of the QIP system 800 (e.g., to the optical controller 820) to enable the implementation of the quantum algorithms or quantum operations. In an example, the algorithms component 810 may perform, coordinate, and/or instruct the performance of operations associated with the generation of elliptical beams described herein.

FIG. 8B shows at least a portion of the optical controller 820. In this example, the optical controller 820 can include a beam controller 821, the optical sources 830, the imaging system 840, AOM configurations 837 that may include one or more of AOMs and optical components including lenses or lens assemblies, and elliptical beam optics 838 for generating elliptical optical beams. As shown by the dotted lines, one or more of the optical sources 830, the imaging system 840, the AOM configurations 837, and the elliptical beam optics 838 may be implemented separate from, but in communication with, the optical controller 820. The elliptical beam optics 838 can include, for example, the optical system 400, the optical system 500, and/or the imaging system 570 used with the optical system 400 or with the optical system 500. The AOM configurations 837 can include, for example, the AOM 620.

The imaging system 840 includes a CCD 741 (or similar imager or camera) and an image processing algorithms component 842. The optical sources 830 includes one or more modulators 825 and multiple laser sources 835a, . . . , 835b, which may be used for one or more of the functions described above (e.g., to produce laser or gate beams for manipulation of qubit information). In one aspect, the laser sources 835a, . . . , 835b may generate optical beams that can be magnified differently in different directions by using the elliptical beam optics 838 to image elliptical Gaussian optical beams on ions in the ion trap 870. In another aspect, the modulators 825 may implement one or more of the RF generators described herein (e.g., RF generators 610a and 610b in FIG. 6) to produce the different tones used by an AOM to diffract optical beams.

The beam controller 821 is configured to perform various aspects described herein for imaging elliptical optical beams for quantum processing. The beam controller 821 may include a AOM configuration control component 822 having a tone generation component 824 to control the various aspects associated with the generation and application of RF control signals based on different tones, and a polarization component 826 to control the various aspects associated with using AOMs to provide fine and rapid control of polarization by generating appropriate RF control signals. The AOM configuration control component 822 may interact with the optical sources 830 (e.g., with the modulators 825) in connection with tone generation and control and polarization control. In one implementation, the AOM configuration control component 822 may be implemented separate from the beam controller 821 but in communication with the beam controller 821.

The various components of the optical controller 820 may operate individually or in combination to perform the various functions described in this disclosure. Moreover, the various components of the optical controller 820 may operate with one or more of the components of the QIP system 800 to perform the various functions described in this disclosure.

Figure 9:
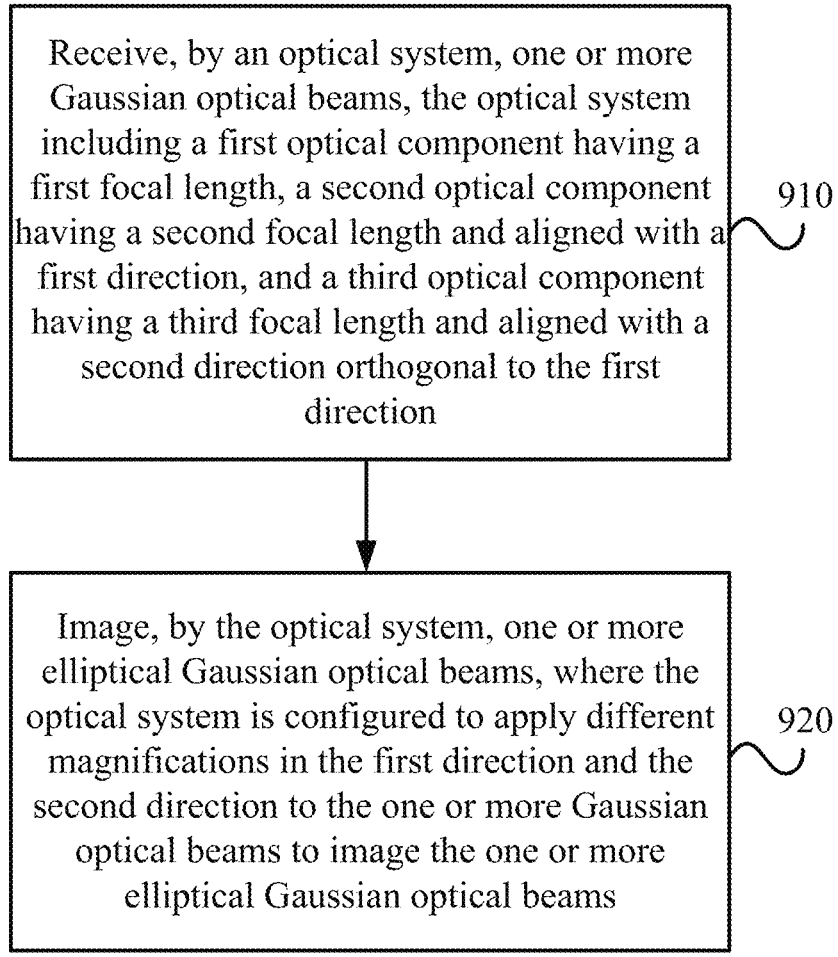
FIG. 9 is a flow diagram that illustrates an example of a method in accordance with aspects of this disclosure.

FIG. 9 is a flow diagram that illustrates an example of a method 900 for generating elliptical optical beams in accordance with aspects of this disclosure. The method 900 may be performed by the computer device 700 or by the QIP system 800.

At 910, the method 900 includes receiving, by an optical system (e.g., the optical system 400, the optical system 500), one or more optical beams, the optical system including a first optical component having a first focal length (e.g., the first optical components 410, 510), a second optical component having a second focal length and aligned with a first direction (e.g., the second optical components 420, 520), and a third optical component having a third focal length and aligned with a second direction orthogonal to the first direction (e.g., the third optical components 430, 530).

At 920, the method 900 includes imaging (e.g., forming or producing an image), by the optical system, one or more elliptical Gaussian optical beams (e.g., the optical beams 140'), where the optical system is configured to apply different magnifications in the first direction and the second direction to the one or more optical beams (e.g., the input optical beams) to image the one or more elliptical Gaussian optical beams (e.g., the output optical beams).

In an aspect of the method 900, each of the one or more optical beams received by the optical system (e.g., input optical beams) is a circular Gaussian optical beam or an elliptical Gaussian optical beam. When each of the one or more optical beams is an elliptical Gaussian optical beam, the corresponding one of the one or more elliptical Gaussian optical beam imaged by the optical system (e.g., output optical beams) has a looser focus in the first direction and a tighter focus in the second direction. The looser focus in one direction and tighter focus in another direction are achieved by the application of different magnifications to the polar radius and the equatorial radius of the elliptical Gaussian optical beams received by the optical system.

In another aspect of the method 900, each of the one or more elliptical Gaussian optical beams has a beam waist in the first direction that is larger than a beam waist in the second direction (e.g., the optical beams 140'), and each of the one or more elliptical Gaussian optical beams has a beam waist location in the first direction that coincides at a location along a propagation direction (e.g., z direction) with a beam waist location in the second direction. The propagation direction is orthogonal to both the first direction and the second direction.

In another aspect of the method 900, the magnification in the first direction is a demagnification M, the magnification in the second direction is a demagnification aM, and a is an ellipticity ratio.

In another aspect of the method 900, the second optical component is positioned after the first optical component along a propagation direction (e.g., z direction), the third optical component is positioned after the second optical component along the propagation direction, and imaging the one or more elliptical Gaussian optical beams includes imaging the one or more elliptical Gaussian optical beams at a location along the propagation direction that coincides with both the second focal length of the second optical component and the third focal length of the third optical component (see e.g., the optical system 400).

In another aspect of the method 900, the first optical component is a spherical lens, the second optical component is a first cylindrical lens, and the third optical component is a second cylindrical lens. The spherical lens can be a compound lens (e.g., includes multiple optical elements such as multiple lenses), and the first cylindrical lens and the second cylindrical lens can both be positive cylindrical lenses (e.g., positive cylindrical lens 475). In one implementation, the spherical lens includes a slow negative lens followed by a fast positive lens, and the method 900 further includes controlling (e.g., by the optical controller 820) a separation between the slow negative lens and the fast positive lens such that the spherical lens is a net positive lens. For example, the optical controller 820 can control the spacing or separation between the slow negative lens and the fast positive lens (e.g., by moving one or both lenses) to obtain a desired focal length for the spherical lens.

In another aspect of the method 900, the optical system is part of a QIP system (e.g., the QIP system 800), the QIP system includes a surface trap (e.g., the ion trap 870, which is an example of the surface trap 110) configured to trap one or more ions, and the imaging of the one or more elliptical Gaussian optical beams includes imaging each of the one or more elliptical Gaussian optical beams on a corresponding one of the one or more ions. The method 900 may further include modulating, by an AOM in the QIP system (e.g., the AOM 620, the AOM configurations 837), the one or more Gaussian optical beams with tones causing the one or more Gaussian optical beams to be diffracted (see e.g., FIG. 6), receiving the one or more Gaussian optical beams includes receiving the diffracted one or more Gaussian optical beams, and imaging each of the one or more elliptical Gaussian optical beams on the corresponding ion includes having the optical system apply the different magnifications in the first direction and the second direction to the diffracted one or more Gaussian optical beams.

In another aspect of the method 900, the magnification in the first direction, the magnification in the second direction, or both, is a demagnification (e.g., M<1) that reduces a radius of each of the one or more Gaussian optical beams by a factor ranging from 40 to 100.

In another aspect of the method 900, the first optical component is a spherical lens, the second optical component is a first negative cylindrical lens, the third optical component is a second negative cylindrical lens and is positioned after the first optical component and before the second optical component along a propagation direction, and imaging the one or more elliptical Gaussian optical beams includes virtually imaging the one or more elliptical Gaussian optical beams at a position along the propagation direction that is before the third optical component (see e.g., the optical system 500).

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. An optical system for generating elliptical optical beams, comprising:
    a first optical component having a lens with a first focal length;
    a second optical component having a lens with a second focal length and aligned along a first direction; and
    a third optical component having a lens with a third focal length and aligned along a second direction that is orthogonal to the first direction,
    wherein the first and third optical components virtually focus, in the first direction, at least one optical beam received by the optical system, and
    wherein the first and second optical components virtually focus, in the second direction, the at least one optical beam, such that a virtual image is formed at a same plane for the first and second directions.

2. The optical system according to claim 1, further comprising an imaging component positioned after the third optical component that is configured to re-image with a magnification the virtual image to form a real image on a trapped ion of a quantum information processing system.

3. The optical system according to claim 1, wherein the lens of the second optical component is a first negative cylindrical lens and the lens of the third optical component is a second negative cylindrical lens.

4. The optical system according to claim 3, wherein the third optical component is positioned after the first optical component and before the second optical component along a propagation direction.

5. The optical system according to claim 4, wherein the first and second optical components virtually focus the at least one optical beam to form the virtual image as one or more elliptical Gaussian optical beams at a position along the propagation direction that is before the third optical component.

6. The optical system according to claim 1, wherein the lens of the second optical component is a first positive cylindrical lens and the lens of the third optical component is a second positive cylindrical lens.

7. The optical system of claim 1, wherein the at least one optical beam is a circular Gaussian optical beam or an elliptical Gaussian optical beam.

8. The optical system of claim 7, wherein, when the at least one optical beam is an elliptical Gaussian optical beam, the corresponding at least one more elliptical Gaussian optical beam imaged by the optical system has a looser focus in the first direction and a tighter focus in the second direction.

9. The optical system of claim 1, wherein the at least one optical beam is an elliptical Gaussian optical beam having a beam waist in the first direction that is larger than a beam waist in the second direction, and the elliptical Gaussian optical beam has a beam waist location in the first direction that coincides at a location along a propagation direction with a beam waist location in the second direction.

10. The optical system of claim 4, wherein the propagation direction is orthogonal to both the first direction and the second direction.

11. The optical system of claim 2, wherein the magnification in the first direction is a demagnification M, the magnification in the second direction is a demagnification aM, and a is an ellipticity ratio.

12. The optical system of claim 1, further comprising an imaging system configured to perform image quality measurements and analysis at a real image plane of both the first optical component and the second optical component.

13. The optical system of claim 1, further comprising one or more additional optical components after the first optical component and the second optical component, the one or more additional components including one or more of a spatial filer, an aperture, or a field lens.

14. The optical system of claim 1, wherein the first optical component is a spherical lens.

15. The optical system of claim 2, wherein the magnification in the first direction, the magnification in the second direction, or both, is a demagnification that reduces a radius of each of the at least one optical beam by a factor ranging from 40 to 100.

* * * * *